(12) United States Patent
Xiao et al.

(10) Patent No.: US 12,471,807 B1
(45) Date of Patent: Nov. 18, 2025

(54) BIOMETRIC SENSOR COMPRISING OXIDE SEMICONDUCTOR, BIOMETRIC SENSOR ON DISPLAY, AND METHODS OF MAKING AND USING THE SAME

(71) Applicant: Next Biometrics Group ASA, Oslo (NO)

(72) Inventors: Tian Xiao, Everett, WA (US); King Hong Kwan, Bellevue, WA (US)

(73) Assignee: Next Biometrics Group ASA, Oslo (NO)

(*) Notice: Subject to any disclaimer, the term of this patent is extended or adjusted under 35 U.S.C. 154(b) by 0 days.

(21) Appl. No.: 19/205,451

(22) Filed: May 12, 2025

Related U.S. Application Data

(60) Provisional application No. 63/647,208, filed on May 14, 2024.

(51) Int. Cl.
| | | |
|---|---|---|
| A61B 5/1172 | (2016.01) | |
| G01K 7/01 | (2006.01) | |
| G06V 40/13 | (2022.01) | |
| G06V 40/40 | (2022.01) | |

(52) U.S. Cl.
CPC ............ *A61B 5/1172* (2013.01); *G01K 7/015* (2013.01); *G06V 40/13* (2022.01); *G06V 40/40* (2022.01); *A61B 2562/0271* (2013.01)

(58) Field of Classification Search
CPC .......... A61B 5/1172; A61B 2562/0271; G01K 7/015; G06V 40/13; G06V 40/40
See application file for complete search history.

(56) References Cited

U.S. PATENT DOCUMENTS

| | | | |
|---|---|---|---|
| 5,275,851 A | * | 1/1994 | Fonash ............... C23C 16/0272 |
| | | | 438/479 |
| 6,091,837 A | | 7/2000 | Dinh |
| 8,724,860 B2 | | 5/2014 | Dinh |
| 11,790,684 B2 | | 10/2023 | Kwan et al. |
| 2003/0230733 A1 | * | 12/2003 | Tanaka .................. H04N 25/76 |
| | | | 348/E5.09 |
| 2006/0217915 A1 | | 9/2006 | Dinh |
| 2007/0128905 A1 | | 6/2007 | Speakman |
| 2008/0166028 A1 | | 7/2008 | Turek et al. |

(Continued)

OTHER PUBLICATIONS

Kang et al., Effects of crystalline structure of IGZO thin films on the electrical and phot-stability of metal-oxide thin-film transistors (Year: 2021).*

(Continued)

*Primary Examiner* — John B Strege
(74) *Attorney, Agent, or Firm* — Duane Morris LLP

(57) ABSTRACT

A sensor, a device, a system, and a method, for biometric sensing, are provided. Such a device or system includes a micro heater and a micro temperature sensor for at least active thermal sensing, which may comprise an oxide semiconductor material. The micro heater and the micro temperature sensor may be separate or combined in one pixel. The present disclosure also provides an out-cell type or an in-cell type of biometric sensor on display device, for example, an out-cell type or an in-cell type fingerprint sensor on display (FoD) device. The pixels for active thermal sensing include an oxide semiconductor material. The methods of making and the methods of using the sensors, the devices, or the system are also provided.

24 Claims, 16 Drawing Sheets

(56) References Cited

U.S. PATENT DOCUMENTS

| | | | |
|---|---|---|---|
| 2010/0102450 A1 | 4/2010 | Narayan | |
| 2014/0049505 A1* | 2/2014 | Radivojevic | G08B 6/00 345/173 |
| 2015/0036065 A1 | 2/2015 | Yousefpor et al. | |
| 2019/0377012 A1* | 12/2019 | Soo | G01R 19/25 |
| 2019/0393353 A1* | 12/2019 | Jeong | H10D 30/6757 |
| 2020/0151415 A1 | 5/2020 | Yuan | |
| 2021/0120324 A1 | 4/2021 | Seo et al. | |
| 2022/0136908 A1* | 5/2022 | Jang | H10D 86/60 374/178 |
| 2022/0222964 A1 | 7/2022 | Kwan et al. | |
| 2022/0349749 A1* | 11/2022 | Siskos | H04N 25/77 |
| 2022/0366718 A1 | 11/2022 | Mueller et al. | |
| 2023/0353903 A1* | 11/2023 | Ardanuc | H10F 39/803 |

OTHER PUBLICATIONS

Abe, et al. "Simulation Study of Self-Heating and Edge Effects on Oxide-Semiconductor TFTs: Channel-Width Dependence," Proceedings of the International Display Workshops, Nov. 2019, 4 pages.

Chen, et al., "Density of States of a—InGaZnO From Temperature-Dependent Field-Effect Studies," IEEE Transactions on Electron Devices, Jun. 2009, 56(6), pp. 1177-1183.

Estrada, et al., "Temperature dependence of the electrical characteristics up to 370 K of amorphous In—Ga—Zn—O thin film transistors," Microelectronics Reliability, vol. 56, Jan. 2016, pp. 29-33.

Jeong, et al., "Temperature Sensor Made of Amorphous Indium-Gallium-Zinc Oxide TFTs," IEEE Electron Device Letters, 34(12), Nov. 1, 2013, pp. 1569-1571.

Jeroish, et al., "Microheater: material, design, fabrication, temperature control, and applications—a role in COVID-19," Biomedical Microdevices Dec. 2021 24( 3), 49 pages.

Ju, et al., "Electrical Properties of Amorphous Titanium Oxide Thin Films for Bolometric Application," Advances in Condensed Matter Physics, Nov. 2013, 5 pages.

Park, et al., "Fabrication of amorphous InGaZnO thin-film transistor-driven flexible thermal and pressure sensors," Semicond. Sci. Technol., 27(1), Aug. 2012, 8 pages.

Roul, et al., "Transparent and flexible heaters based on Al:ZnO degenerate semiconductor," J. Appl. Phys. 122, Oct. 2017.

Tilkioglu, et al., "Digitally alloyed ZnO and TiO2 thin film thermistors by atomic layer deposition for uncooled microbolometer applications," Journal of Vacuum Science & Technology A, 35(2), Feb. 2017, 5 pages.

Zhou, et al., "Giant temperature coefficient of resistance in Co-doped ZnO thin films," Applied Physics A, 114, Mar. 21, 2013, pp. 809-812.

"Semiconductor Negative Temperature Coefficient Characteristics ofNTC Thermistors," Dongguan Yaxun Electronic Hardware Product Co., Ltd., Dec. 24, 2019, Accessed Oct. 3, 2022 <https://www.ntcsensors.com/Semiconductor_Negative_Temperature_Coefficient_Characteristics_of_NTC_Thermistors/>.

International Search Report and Written Opinion for PCT/NO2025/050085 dated Jul. 11, 2025, 9 pages.

International Search Report and Written Opinion for PCT/NO2025/050084 dated Jul. 10, 2025, 8 pages.

De Roose, et al., 14-1: Flexible 1-20 Large-Area Multi-Fingerprint Sensors based on Thermal Mass Detection, SID Symposium Digest of Technical Papers, Aug. 2020, 51(1): 176-179.

Guo, et al., "Al2O3-Based a-IGZO 1-20 Schottky Diodes for Temperature Sensing", Sensors, Jan. 2019, 19(2): 224.

Mainguet, et al., "A large-area curved 1-29 pyroelectric fingerprint sensor", 2019 IEEE International Electron Devices Meeting (IEDM), IEEE, Dec. 2019, 4 pages.

\* cited by examiner

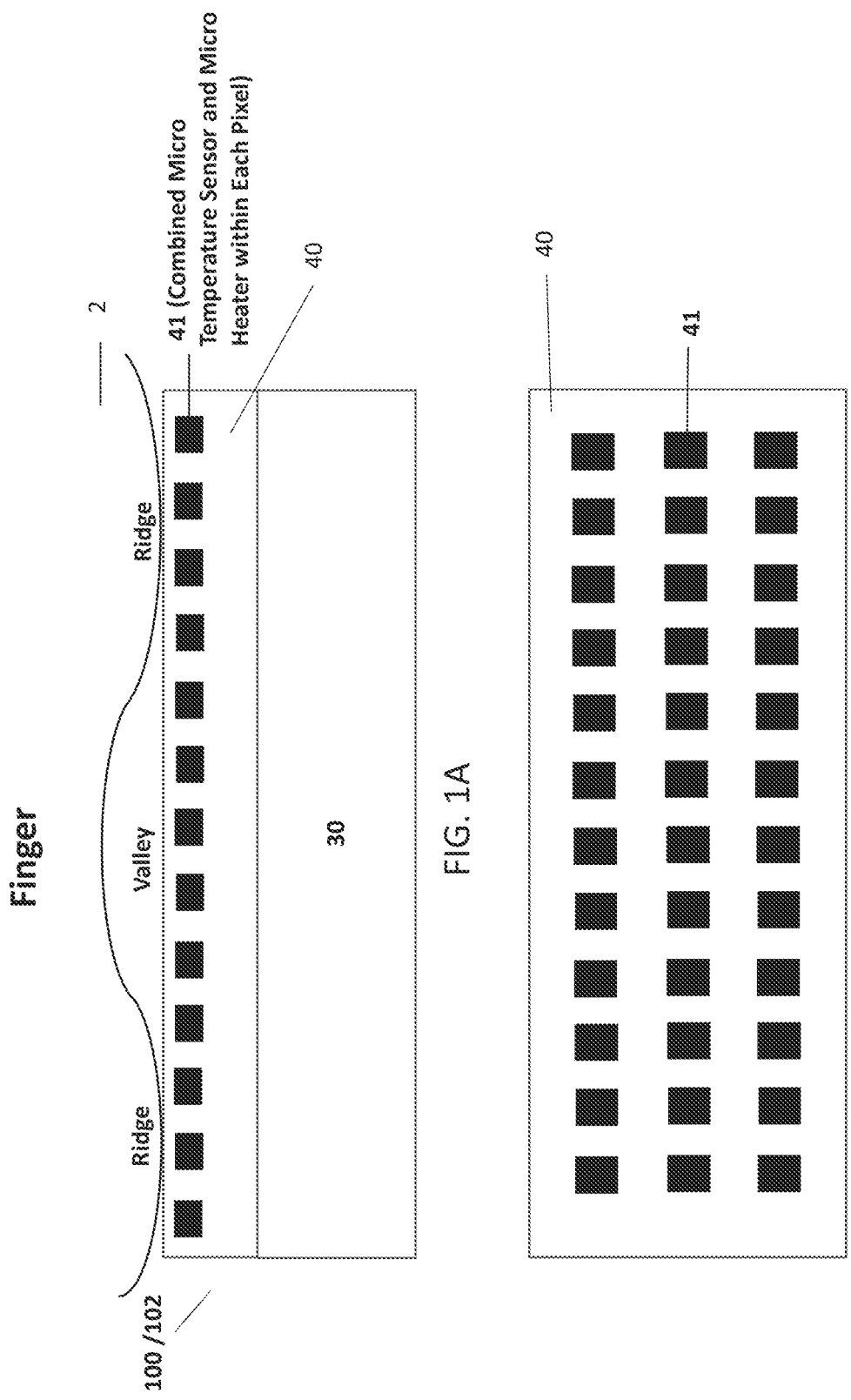

BIOMETRIC SENSOR COMPRISING OXIDE SEMICONDUCTOR, BIOMETRIC SENSOR ON DISPLAY, AND METHODS OF MAKING AND USING THE SAME

PRIORITY CLAIM AND CROSS-REFERENCE

This application claims the benefit of U.S. Provisional Application No. 63/647,208, filed on May 14, 2024, which application is expressly incorporated by reference herein in its entirety.

FIELD OF THE INVENTION

The disclosure relates to a device or apparatus and a method for measuring biometric patterns generally. More particularly, the disclosed subject matter relates to a device or apparatus for display and biometric sensing such as a fingerprint sensor, a system, and a method for measuring or capturing an image of a biometric (e.g., fingerprint) pattern.

BACKGROUND

Biometric sensors such as fingerprint sensors are one form of technology used to provide biometric security. The fine patterns formed by ridges and valleys on a skin of a finger can be mapped by sensing arrays, which vary in basic operating principles. Some sensors utilize heat signals, while others utilize electrical, pressure, or optical signals. Active sensors quantify a specific physical parameter response to a given stimulus. Accuracy levels are limited by the physical principles used to read fingerprint patterns. Furthermore, immunity to environmental variables such as dirt or humidity is also important when performing a fingerprint scan.

Fingerprint sensors are often used in electronic devices to verify the identity of the user and to restrict access unless the sensor verifies that an authorized user is attempting to use the device. For example, certain smart credit cards require verification of the user via a fingerprint sensor before use. Fingerprint sensors are also included in computing devices—such as smartphones, tablet computers, laptops, and point of sale devices—to ensure that only authorized users are able to unlock and use such devices.

SUMMARY OF THE INVENTION

The present disclosure provides a sensor, a device, a system, and a method, for biometric sensing. In accordance with some embodiments, such a device or system includes a micro heater and a micro temperature sensor, which may comprise an oxide semiconductor material. In accordance with some embodiments, the present disclosure also provides an out-cell type or an in-cell type of biometric sensor on display device, for example, an out-cell type or an in-cell type fingerprint sensor on display (FoD) device, as described herein. The pixels for thermal sensing comprises an oxide semiconductor material as described herein. The methods of making and the methods of using the sensors, the devices, and the system are also provided.

In one aspect, the present disclosure provides a sensor, a device comprising the sensor, and a system comprising the sensor, for biometric sensing. The sensor comprises a pixel matrix having a plurality of pixels configured to measure a biometric pattern. The sensor further comprises a micro temperature sensor and a micro heater in each pixel. The micro temperature sensor comprises an oxide semiconductor material. The micro heater may comprise an oxide semiconductor material or an electrically conductive material such as a metal, a transparent conductive oxide (TCO) or a combination thereof. The plurality of pixels comprise thermal sensing pixels configured to operate based on at least the active thermal sensing principle, in which a low power heat pulse is applied and a response corresponding to a biometric pattern is measured. In the present disclosure, the active thermal sensing can be combined with the passive thermal sensing or other modes.

In some embodiments, the oxide semiconductor material comprises indium gallium zinc oxide (IGZO) or a modified IGZO as described herein. The modified IGZO comprises an element such as Al, Sn, Ti, Ta, Zr, Co, Ni, Hf, Si, F, Ge, Y, La, or any combination thereof. The IGZO or a modified IGZO is amorphous or crystalline. The oxide semiconductor material may have a temperature coefficient in a suitable range, for example, from $-2$ mV/° C. and $-200$ m V/° C. or any other ranges as described herein. The oxide semiconductor material may have a sheet resistance in a suitable range, for example, from 5 K$\Omega$/sq to 3 M$\Omega$/sq or any other ranges as described herein. The oxide semiconductor material may also have a good transparency as described herein.

Each of the micro temperature sensor and the micro heater is a thin film transistor (TFT), a diode, or a thermistor.

In some embodiments, the micro temperature sensor and the micro heater are combined into one device in each pixel. In some embodiments, the micro temperature sensor and the micro heater are separate in each pixel, and the micro heater is a portion of a plurality of micro heater lines. The micro heater may be made of metals.

In some embodiments, the sensor further comprises capacitive touch sensing elements, which are self-capacitive or mutual capacitive, and active matrix or passive matrix. For example, the capacitive touch sensing elements are passive matrix mutual capacitive touch sensors or active matrix self-capacitive touch sensors in some embodiments.

The sensor has excellent anti-spoofing performance. For example, in some embodiments, the capacitive touch sensing elements are active matrix self-capacitive touch sensors used in combination with active thermal sensing to enhance anti-spoofing performance. For another example, the thermal sensing pixels comprises pixels for passive thermal sensing in combination with active thermal sensing to enhance anti-spoofing performance.

In another aspect, the present disclosure provides a device comprising such a sensor and a system comprising such a sensor as described herein. The present disclosure also provides a method of making such a sensor. The method comprising forming the pixel matrix having a plurality of pixels with the micro temperature sensor and the micro heater in each pixel.

In another aspect, the present disclosure provides a device (or a system) of biometric sensor on display such as fingerprint sensor on display (FoD). Such a device or system comprises a display layer, a sensor substrate disposed over the display layer, and a sensor layer disposed on the sensor substrate and comprising a pixel matrix. The pixel matrix has a plurality of pixels configured to measure a biometric pattern. The plurality of pixels comprise capacitive touch sensing elements, and thermal sensing pixels configured to operate based on at least the active thermal sensing principle, in which a low power heat pulse is applied and a response corresponding to a biometric pattern is measured.

The capacitive touch sensing elements are self-capacitive or mutual capacitive. The capacitive touch sensing elements are active matrix or passive matrix.

The capacitive touch sensing elements are passive matrix mutual capacitive touch sensors or active matrix self-capacitive touch sensors. Thermal sensing pixels comprise an oxide semiconductor material. In some embodiments, the oxide semiconductor material comprises indium gallium zinc oxide (IGZO) or a modified IGZO as described herein. Each of the thermal sensing pixels comprises a thin film transistor (TFT), a diode, or a thermistor, or a combination thereof.

In some embodiments, the device further comprises a transparent hard coating disposed on the sensor layer.

In some embodiments, the device further comprises an optically clear adhesive disposed between the sensor substrate and the display layer.

In some embodiments, the device is an out-cell type of fingerprint sensor on display (FoD) device.

The device has excellent anti-spoofing performance. For example, in some embodiments, the capacitive touch sensing elements are active matrix self-capacitive touch sensors used in combination with active thermal sensing to enhance anti-spoofing performance. For another example, the thermal sensing pixels comprises pixels for passive thermal sensing in combination with active thermal sensing to enhance anti-spoofing performance.

In another aspect, the present disclosure provides a device of biometric sensor in display, which comprises a substrate, a display layer disposed over the substrate, and a sensor layer disposed within the display layer. The display layer comprises a plurality of display pixels. The sensor layer comprises a pixel matrix. The pixel matrix has a plurality of pixels for sensing configured to measure a biometric pattern. The plurality of pixels comprise capacitive touch sensing elements. Thermal sensing pixels are configured to operate based on at least the active thermal sensing principle, in which a low power heat pulse is applied and a response corresponding to a biometric pattern is measured.

The capacitive touch sensing elements are self-capacitive or mutual capacitive. The capacitive touch sensing elements are active matrix or passive matrix.

In some embodiments, the capacitive touch sensing elements is passive matrix mutual capacitive touch sensors or active matrix self-capacitive touch sensors, and the thermal sensing pixels comprise an oxide semiconductor material. In some embodiments, the oxide semiconductor material comprises indium gallium zinc oxide (IGZO) or a modified IGZO as described herein. Each of the thermal sensing pixels comprises a thin film transistor (TFT), a diode, or a thermistor, or a combination thereof.

In some embodiments, the device further comprises a transparent hard coating disposed over the display layer.

In some embodiments, the device is an in-cell type of fingerprint sensor on display (FoD) device.

The device has excellent anti-spoofing performance. For example, in some embodiments, the capacitive touch sensing elements are active matrix self-capacitive touch sensors used in combination with active thermal sensing to enhance anti-spoofing performance. For another example, the thermal sensing pixels comprises pixels for passive thermal sensing in combination with active thermal sensing to enhance anti-spoofing performance.

In another aspect, the present disclosure provides a system comprising any sensor or device as described herein.

In another aspect, the present disclosure provides a method of making the sensor or device or system as described herein.

In the products and the method described herein, the biometric pattern is a fingerprint or a pattern from a hand palm in some embodiments.

In another aspect, the present disclosure provides a method of using any of the sensors or devices or systems as described herein. The method comprises a step of measuring or capturing an image of a biometric pattern of a subject. In some embodiments, the biometric pattern is a fingerprint or a pattern from a hand palm. The sensor has anti-spoofing performance characterized by extremely low false rejection rate (FRR) and false acceptance rate (FAR). For example, the FRR is less than 1% and the FAR is less than 0.001%, for example, less than 1 ppm. The FRR and the FAR can be any other ranges as described herein.

BRIEF DESCRIPTION OF THE DRAWINGS

The present disclosure is best understood from the following detailed description when read in conjunction with the accompanying drawings. It is emphasized that, according to common practice, the various features of the drawings are not necessarily to scale. On the contrary, the dimensions of the various features are arbitrarily expanded or reduced for clarity. Like reference numerals denote like features throughout specification and drawings.

FIG. 1A is a sectional view illustrating an exemplary fingerprint sensor array with combined micro temperature sensor and micro heater within each pixel (Configuration 1) in accordance with some embodiments.

FIG. 1B is a top plan view illustrating three exemplary rows of the exemplary fingerprint sensor array of FIG. 1A.

FIG. 4A is a top view of an example of the device in FIG. 3 (Scenario 1) through a transparent hard coating.

FIG. 4B is a top view of an example of the device in FIG. 3 (Scenario 2) through a transparent hard coating.

FIG. 8A is a sectional view illustrating the sensor array. FIG. 8B is a top plan view illustrating a partial row of the sensor array.

DETAILED DESCRIPTION

Figure 2A:
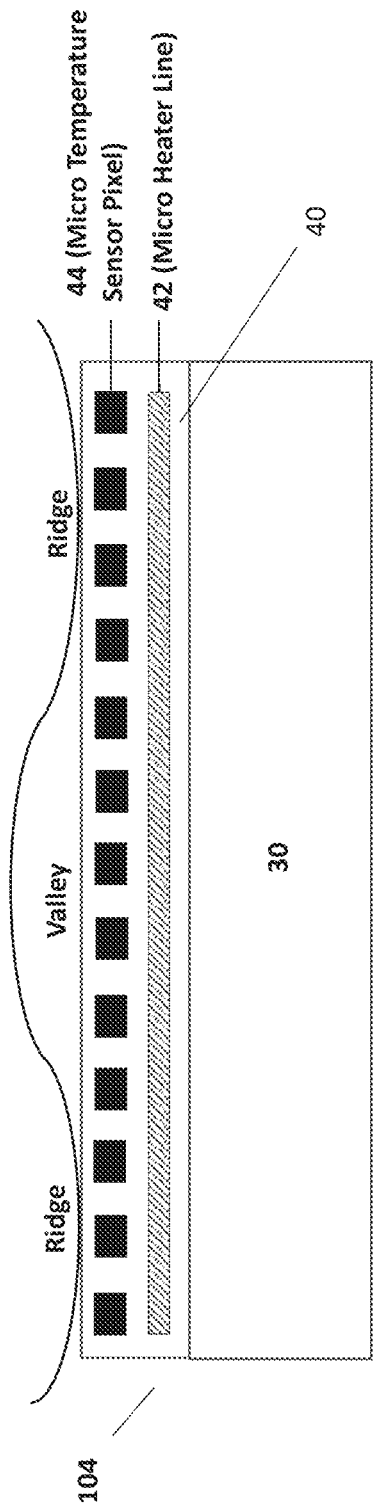
FIG. 2A is a sectional view illustrating an exemplary fingerprint sensor array with separate micro temperature sensors and micro heater lines (Configuration 2) in accordance with some embodiments.

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

For purposes of the description hereinafter, it is to be understood that the embodiments described below may assume alternative variations and embodiments. It is also to be understood that the specific articles, compositions, and/or processes described herein are exemplary and should not be considered as limiting.

In the present disclosure the singular forms "a," "an," and "the" include the plural reference, and reference to a particular numerical value includes at least that particular value, unless the context clearly indicates otherwise. When values are expressed as approximations, by use of the antecedent "about," it will be understood that the particular value forms another embodiment. As used herein, "about X" (where X is a numerical value) preferably refers to ±10% of the recited value, inclusive. For example, the phrase "about 8" preferably refers to a value of 7.2 to 8.8, inclusive. Where present, all ranges are inclusive and combinable. For example, when a range of "1 to 5" is recited, the recited range should be construed as including ranges "1 to 4", "1 to 3", "1-2", "1-2 & 4-5", "1-3 & 5", "2-5", and the like. In addition, when a list of alternatives is positively provided, such listing can be interpreted to mean that any of the alternatives may be excluded, e.g., by a negative limitation in the claims. For example, when a range of "1 to 5" is recited, the recited range may be construed as including situations whereby any of 1, 2, 3, 4, or 5 are negatively excluded; thus, a recitation of "1 to 5" may be construed as "1 and 3-5, but not 2", or simply "wherein 2 is not included." It is intended that any component, element, attribute, or step that is positively recited herein may be explicitly excluded in the claims, whether such components, elements, attributes, or steps are listed as alternatives or whether they are recited in isolation.

Unless expressly indicated otherwise, the term "connected" or "coupled" used herein are understood to encompass different connections or coupling between or among the components. In some embodiments, the connection or coupling are made so as to conduct electricity or transmit signals for communication. Such a connection or coupling can be through wire, wireless, or cloud-based modes.

The term "biometric sensor" used herein refers to a sensor for detecting, capturing, and/or measuring unique biological traits and patterns of a subject such as a human being for identification and authentication purposes. In some embodiments, the biometric pattern refers to a pattern of a skin in one part of body of a subject such as a human subject, including but not limited to finger print or palm print. A biometric sensor may also be called a fingerprint sensor or a palm sensor. A biometric sensor comprises an array of pixels, which may include microheaters and/or micro temperature sensor. When a biometric sensor is operated based on thermal principles, it may be operated based on active thermal or active thermal in combination of passive thermal principles in the present disclosure.

The principles of "active thermal" and "passive thermal" are distinguished based on whether heat is applied to a biometric sensor, for example, through a microheater in the array of the biometric sensor.

For example, when a biometric sensor such as a fingerprint sensor is configured to be operated based on the principle of "passive thermal sensing," such a sensor comprises an array of pixels, each comprising a micro temperature sensor only based on thin film devices, which maps fingerprint images based on the minute temperature differences in sensor surface areas corresponding to the "valley" and "ridge" regions of the fingerprint. No microheater exists or is turned on. The ridges are raised lines on the skin such as a skin of a finger tip, and the valleys are depressions between the ridges.

In various embodiments, the biometric sensor such as a fingerprint sensor in the present disclosure operates on the active thermal sensing principle. In such embodiments, a low power heat pulse is applied to each sensor pixel over a short period of time and a response is measured. Based on the active thermal principle, active thermal sensors measure the heat conductance of an object for a given heating stimulus. Examples of the active thermal sensing principle suitable for a biometric sensor such as a fingerprint sensor in the present disclosure are disclosed in U.S. Pat. No. 6,091,837 to Dinh, entitled "Sensor for Acquiring a Fingerprint Image Based on Heat Transfer" and U.S. Pat. No. 8,724,860, also to Dinh, entitled "Apparatus for Fingerprint Sensing and Other Measurements," the entireties of each of which are incorporated by reference herein. U.S. Pat. No. 6,091,837 describes fingerprint sensing and such a principle may be used for other biometric sensors in the present disclosure. The response to the stimulus is measured by each of the sensing sites within a sensor array. The thermal response of an element is in part a function of the stimulus provided, i.e., the larger the stimulus, the larger the response. Sensing sites are heated by application of an electrical current to the site. The low power pulse may be applied by a microheater in a pixel in the biometric sensor.

The thermal sensor principle utilizes heat transfer mechanism in order to distinguish fingerprint valleys and ridges, as their skin structures have different heat transfer characteristics. A short heat pulse is applied to selected pixels in a sensor array (or a portion of a sensor array as described herein), and the heat exchange between the finger and the underlying individual sensing pixels is monitored through temperature variation measurement. A relatively high sensing pixel temperature indicates little heat loss or a small heat exchange between the considered sensing pixel and the finger at this point because of low thermal conductivity. The points with low thermal conductivity map the local fingerprint valleys structure, and the points with high thermal conductivity, i.e., having high heat conduction/transfer, map the local fingerprint ridges structure. Intermediate thermal conductivity points correspond to the local transition zone between ridges and valleys. The temperature differences are measured using sensing elements (e.g., fingerprint sensing pixels), and the measurements are processed to generate an image of the fingerprint on the fingerprint sensor.

The active thermal biometric sensor such as a fingerprint sensor can be produced through large-area production processes, such as those that form low temperature polysilicon (LTPS) thin film transistors and devices. In the present disclosure, The active thermal biometric sensor comprises an oxide semiconductor material as described herein. For example, in some embodiments, the oxide semiconductor material is used as in channels of thin film transistors in the biometric sensor. In some embodiments, the oxide semiconductor material is used in thermistors or diodes in the biometric sensor, for example, used as a channel material.

The term "microheater" used herein is understood to compass thin film heaters, which can be two-terminal, such as thermistors or didoes, or three-terminal, such as thin film transistors. The microheater is configured to convert electric energy into heat through Joule heating, which is also known as resistive heating or Ohmic heating as electric current flows through the microheater. The term "micro temperature sensor" used herein is understood to compass thin film device for measuring a local temperature. When a thin film heater possesses a temperature coefficient (unit: $\Delta V/°C.$), it also becomes "micro temperature sensors" and the voltage shift ($\Delta V$) with temperature can be used to sense the temperature change.

The term "two-terminal" used herein refers to a device such as a thermistor or a diode. The term "three-terminal" used herein refers to a device such as a thin film transistor.

When a biometric sensor such as a fingerprint sensor is used to acquire fingerprinting pattern or image in "active thermal sensing" mode, the related micro heaters in the array of the sensor are turned on. When the sensor is operated in "passive thermal sensing" mode, the related micro heaters are turned off.

The term "capacitive sensing" refers to a type of sensing by a measurement to detect a capacitive change to a sensor element. In the present disclosure, a sensor element can be any conductive material such as indium tin oxide (ITO) or a metal thin film, or a metal mesh, or any combination thereof. The change can be due to human interaction, such as a finger or hand. This is also referred as "capacitive touch."

The term "self-capacitive sensing" refers to a type of sensing by measuring changes in capacitance of one electrode as a capacitor, for example, with respect to earth ground as a second plate.

The terms "mutual capacitive sensing" refers to a type of sensing by measuring a change in capacitance relative to two electrodes.

The term "out-cell" means that touch and fingerprint sensors are fabricated on a separate sensor substrate independent of any display substrates. The resulting device may be referred as "biometric sensor on display" device such as fingerprint sensor on display (FoD) device.

The term "in-cell" means that touch and fingerprint sensors are disposed inside the display cells and that the display and the touch and fingerprint sensors are all fabricated on the same substrate. The resulting device may be referred as in-cell type of "biometric sensor on display" device such as fingerprint sensor on display (FoD) device.

The capacitive touch sensing falls into two categories: passive matrix and active matrix capacitive touch sensing.

The term "active matrix" refers to a pixel matrix made of independent pixels, each of which comprises a transistor.

The term "passive matrix" refers to a pixel matrix of x-y coordinates, without dedicated transistor for each pixel.

The passive matrix type does not need any thin film transistors (TFTs) to operate. The active matrix type needs TFTs to drive the capacitor, and the TFTs are preferably low temperature polysilicon (LTPS) based for temperature stability in the present disclosure.

The term "large area" or "large-area" used herein refers to a detection area in a biometric sensor, for example, at least 20 mm×20 mm (400 mm$^2$) in a fingerprint sensor. The term "high resolution" or "high-resolution" used herein refers to the resolution of a biometric sensor having at least 500 pixels per inch (ppi).

The term "spoofing" or "fingerprint spoofing" refers to using artificial or fake biometric patterns such as fingerprints to bypass a biometric security system, essentially impersonating a legitimate user's fingerprint to gain unauthorized access. The term "anti-proofing" or "fingerprint anti-spoofing," also known as fingerprint liveness detection, is a security measure that prevents unauthorized access to systems or devices by detecting and rejecting fake or replicated fingerprint attempts, ensuring that only a live, genuine finger is used for authentication.

The anti-spoofing performance is characterized by False Rejection Rate (FRR) and False Acceptance Rate (FAR), which are recognized as industry-standard performance indicators for evaluating biometric systems, including fingerprint sensors. They are used across industries such as consumer electronics, security, banking, and access control to assess the accuracy and reliability of biometric authentication. The False Rejection Rate (FRR) is defined by the percentage of times a fingerprint sensor incorrectly rejects a legitimate user's fingerprint, failing to authenticate them. The FRR is the number of false rejections divided by a total number of legitimate authentication attempts, and may be multiplied by 100 if it is represented by percentage. A high FRR leads to user frustration, as authorized users are repeatedly denied access. A high FRR is due to poor sensor quality or low resolution; dirty, damaged, or worn fingerprints (e.g., cuts, scars, or moisture); incorrect finger placement or insufficient pressure; or environmental factors like temperature or humidity.

The False Acceptance Rate (FAR) is defined by the percentage of times a fingerprint sensor incorrectly accepts an unauthorized user's fingerprint, granting access to someone who should not have. The FAR is the number of false acceptances divided by a total number of unauthorized authentication attempts, and may be multiplied by 100 if it is represented by percentage. A high FAR compromises security, as it increases the risk of unauthorized access. This is critical in high-security applications like banking or device unlocking. A high FAR may be due to low-quality sensors with insufficient detail capture; similar fingerprint patterns between users (rare but possible); or vulnerabilities to spoofing (e.g., fake fingerprints made from silicone or gelatin).

Therefore, biometric sensor with high quality is very important to desired minimal FRR and FAR.

Organizations like the International Organization for Standardization (ISO), National Institute of Standards and Technology (NIST), and Fast Identity Online (FIDO) Alliance use FRR and FAR in their biometric performance standards, for example, ISO/IEC 19795 for biometric testing. FRR and FAR are often specified in certification processes for biometric devices, such as those used in government ID systems or secure payment systems, to ensure compliance with security and usability requirements.

The criteria depend on the industry and applications. For example, for consumer electronics such as smartphones, good fingerprint sensors aim for FRR<1-2% and FAR<0.001-0.01% to balance user convenience and security. For high-security applications such as banking and government, a lower FAR such as <0.0001% (1 ppm) is desired even if the FRR may be increased slightly.

The present disclosure provides a sensor or device, an apparatus, a system, and a method, for sensing such as biometric sensing. The present disclosure also provides a method of making the sensor, the device, an apparatus, and a system. The present disclosure is described using finger as an exemplary object and fingerprint as an example of a biometric pattern, for the purpose of illustration only. The products and the method provided in the present disclosure can be used for measuring patterns in a partially heat conducting surface of an object in general. For example, such an object can be a hand palm or a skin in other parts of a human body. In accordance with some embodiments, the biometric sensing is combined with display. The resulting device with biometric sensor and display is also referred as "biometric sensor on display." When the biometric sensor is a fingerprint sensor, the resulting device is referred as "fingerprint sensor on display" (FoD). Such a FoD device can be out-cell or in-cell.

The present disclosure provides large-area high-resolution biometric sensors. The sensors and the devices provided in the present disclosure have excellent performance such as anti-spoofing performance characterized by extremely low FAR and FRR. For example, the FRR is less than 1% or 2%, for example, lower than 0.5% or 0.2%, and the FAR is less than 0.001-0.01%, for example, less than 0.001%, or less than 1 ppm.

In FIGS. 1A-10D, like items are indicated by like reference numerals, and for brevity, descriptions of the structure, provided above with reference to the preceding figures, are not repeated. The methods described herein are described with reference to the exemplary structure described in FIGS. 1A-10D.

In accordance with some embodiments, the present disclosure provides large-area high-resolution biometric sensors such as fingerprint sensors, biometric sensor such as fingerprint sensor on display (FoD) technologies that enable integration of touch sensor and fingerprint sensor based on capacitive and active thermal sensing technologies with various types of display technologies, and methods of manufacturing the same. The present disclosure provides related devices, systems, and methods of making and using the same.

Fingerprint sensors are rapidly expanding their applications into smartphones, tablets, laptops, and other consumer electronic devices, because of their notable advantages such as convenience over PIN or password, security of biometrics over other identity verification methods, and easier and less costly implementation than facial recognition. With the rapid adoption of radio-frequency identification (RFID) and near field communication (NFC) into various smart cards and smartphone payment platforms, and the increasing use of smartphones in sensitive areas ranging from home security, personal health care, insurance and banking, to airline check-in and boarding and other uses, it is becoming increasingly imperative to enhance the security of smart cards, smartphones and other consumer electronic devices to the next level without compromising the user convenience.

One approach is through larger area fingerprint sensor, which enables capture of larger amount of biometric information to achieve higher identification accuracy. This can be achieved by shifting the manufacturing of fingerprint sensors from silicon wafer based semiconductor fab to thin film transistor (TFT) based display fab. One significant advantage of the latter approach, aside from the more accurate larger area and optionally flexible stand-alone fingerprint sensors enabled by the TFT fab, arises from the convenience of integrating the TFT-based large-area fingerprint sensor into various types of displays.

As described herein, the TFT-based large-area fingerprint sensors can be incorporated into various displays either through out-cell approach or in-cell approach to achieve fingerprint sensor on display (FoD). The term "out-cell" means that touch and fingerprint sensors are fabricated on a separate sensor substrate independent of any display substrates. The term "in-cell" means that touch and fingerprint sensors are disposed inside the display cells and that the display and the touch and fingerprint sensors are all fabricated on the same substrate. The fingerprint sensors may be on the same plane as the display cell or cells are.

Many attempts are made trying to integrate various types of fingerprint sensor technologies based on optical, capacitive, and ultrasonic principles into displays. However, optical fingerprint sensors are very difficult to be integrated into liquid crystal displays (LCD) because of the interference of the backlight unit. In addition, optical fingerprint sensors are also inherently vulnerable to 2D image forgery (e.g., paper printout). Capacitive fingerprint sensors are prone to errors caused by noisy electrical signals, or sweaty finger, and are very difficult to scale up in size and resolution. The ultrasonic fingerprint sensor technology appears to be only compatible with a very specific type of display-flexible active matrix organic light emitting diode (AMOLED) display, severely limiting its wide adoption in FoD.

A fingerprint sensor based on the principle of "active thermal sensing" comprises an array of pixels, each comprising a micro heater and a micro temperature sensor based on thin film devices, which maps fingerprint images based on the minute temperature differences in sensor surface areas corresponding to the "valley" and "ridge" regions of the fingerprint. The micro heater and the micro temperature sensor within each pixel can be implemented by the same thin film device, or alternatively, the micro heater and the micro temperature sensor of each pixel can be implemented by two independent devices. Upon sensor pixel heating by the micro heater, localized sensor surface areas corresponding to the "valley" regions of the fingerprint will become warmer than those corresponding to the "ridge" regions of the fingerprint, because heat dissipation in the "valley" regions can only occur by heat radiation, which is much less efficient than heat dissipation in the "ridge" regions which can occur by both heat conduction and heat radiation. As a result of its working principle, active thermal fingerprint sensor cannot be spoofed by 2D fingerprint image, and it is capable of providing a larger and more stable signal which makes it less susceptible to the issues associated with the capacitive and ultrasonic fingerprint sensors.

A fingerprint sensor based on the principle of "passive thermal sensing", on the other hand, comprises an array of pixels, each comprising a micro temperature sensor only based on thin film devices, which maps fingerprint images based on the minute temperature differences in sensor surface areas corresponding to the "valley" and "ridge" regions of the fingerprint.

With the exceptions of very high ambient temperatures, for example, in outdoor environment in a very hot summer day, live human finger temperatures are generally appreciably higher than its surroundings in a comfortable in-door office environment due to human body's internal heat production and the insulating properties of the skin. The human body typically maintains a core temperature of around 37° C. and it strives to keep extremities like fingers as warm as possible through blood circulation. Even in cold environments, for example, when the ambient temperature is around 0° C., it is possible for live human fingers to maintain temperatures around 10° C.-15° C.

When a live human finger touches a fingerprint sensor based on "passive thermal sensing" principle, localized sensor surface areas corresponding to the "ridge" regions of the human fingerprint become hotter than those corresponding to the "valley" regions of the fingerprint, because of more efficient heat transfer from the warmer "ridge" regions of live human finger, which can occur by both heat conduction and heat radiation. Heat transfer from the "valley" regions of the human fingerprint to the corresponding sensor surface areas can only occur by heat radiation due to the existence of air gap.

Therefore, the thermal pattern, i.e., temperature pattern of "ridge" versus the "valley" regions, of a live human fingerprint is reversed in terms of fingerprint images acquired from "passive thermal sensing" and "active thermal sensing" principles. In other words, under most common scenarios where live human finger temperature is higher than that of the surrounding environment and the fingerprint sensor, consecutively scanned fingerprint images using passive thermal sensing operation and active thermal sensing operation creates thermal images with reversed gray scale in the ridge and valley regions of the human fingerprint.

In accordance with some embodiments, a fingerprint sensor with dual mode (active and passive thermal sensing) operation can be provided for a powerful anti-spoofing capability. Passive thermal sensing is not preferably used in existing sensors. However, the benefit of this dual-mode thermal measurement is that active thermal evaluates skin heat capacity or thermal effusivity while passive thermal evaluates skin temperature. Two different responses are measured, their fingerprint images can be cross-checked for improving anti-spoofing. Furthermore, a spoof or dead finger usually stays at the ambient temperature unless someone purposefully warms it up or cool it down to mimic body temperature. A live human finger temperature is usually better "regulated" and it has a better chance to be at a temperature different than ambient.

Indium Gallium Zinc Oxide (IGZO) thin film transistors (TFTs) have been researched in the past twenty years as a lower cost alternative to low temperature polysilicon (LTPS) TFTs to address and drive high-resolution electronic displays, especially those with current-driven pixels such as OLED or micro-LED displays. The most dominant type of IGZO TFT used in existing displays is based on amorphous type of IGZO semiconductor. One major weakness of amorphous IGZO is its temperature instability. See e.g., M. Estrada, "Temperature dependence of the electrical characteristics up to 370 K of amorphous In—Ga—Zn—O thin film transistors", Microelectronics Reliability, volume 56, January 2016, p. 29-33. Due to the lack of grain boundaries, the channel carrier (electron) concentration rises rapidly with temperature due to thermal activation, and these carriers can move freely without being impeded or restricted by the grain boundaries. This generally results in more pronounced negative threshold voltage ($V_{th}$) shift of transfer curves of amorphous IGZO TFTs, as compared to LTPS TFTs. The latter uses polysilicon as channel semiconductor material, where the abundance of grain boundaries, which help trap and impede the carriers, partially offsets the enhanced thermal activation of carriers at higher temperatures, resulting in less pronounced negative $V_{th}$ shift of LTPS TFT transfer curves.

In order to overcome the temperature instability issue of amorphous IGZO TFTs, crystalline type of IGZO, such as CAAC-IGZO (C-Axis Aligned Crystalline Indium Gallium Zinc Oxide) has been developed in recent years, which among other things significantly enhanced the temperature stability of TFTs based on CAAC-IGZO. Other ways of enhancing the IGZO temperature stability have also been researched, e.g., by modifying the IGZO composition so that stronger bonds with oxygen are achieved to minimize the loss of oxygen at higher temperatures thereby limiting the rise of carrier concentration associated with the formation of oxygen vacancies. Incorporating additional cation elements into, or replacing the existing cation elements in IGZO with, elements such as Al, Sn, Ti, Ta, Zr, Co, Ni, Hf, Si, F, Ge, and rare earth elements such as Y and La, was known to help enhance the TFT temperature stability. However, chemical bonds between cation elements and oxygen in IGZO or in other types of oxide semiconductors are still ionic in nature, which are inherently not as strong as the covalent bonds found between silicon atoms in polysilicon. The loss of oxygen at high temperatures is therefore inevitable for IGZO or other types of oxide semiconductors, making them inherently more susceptible to rapid rise of carrier concentration as a result of the formation of oxygen vacancies, resulting in more pronounced negative Vih shift with temperature for most oxide semiconductors as compared to LTPS.

Oxide semiconductor TFTs with improved temperature stability generally exhibit lower mobility, with reduced carrier concentration and higher sheet resistance. On the other hand, removing certain cation element such as Ga from IGZO would result in increased carrier concentration and lower sheet resistance, resulting in greater temperature instability, i.e., more pronounced negative $V_{th}$ shift with higher temperature.

While the inherent temperature instability (or sensitivity) of TFTs based on oxide semiconductors is a challenge for the display industry, it also presents opportunities to leverage their large negative Vin shift with temperature for temperature sensing applications in the present disclosure. In this context, the negative $V_{th}$ shift with temperature is also known as "Temperature Coefficient-$K_{vt}$." For example, between 300 K (27° C.) and 330 K (57° C.), large negative $V_{th}$ shift of −2.5V have been reported in amorphous IGZO TFT, resulting in very impressive temperature coefficient: $K_{vt}$=−2.5V/30° C.=−83 mV/° C. For applications in active thermal fingerprint sensing, the attribute of pronounced negative $V_{th}$ shift with temperature (large negative $K_{vt}$) makes oxide semiconductors ideal candidates for active thermal sensing pixel elements. The very large range of Kw (from −9 mV/° C. to −83 mV/° C. as reported) reflects the very large range of carrier concentrations and sheet resistance achievable in the oxide semiconductor thin films, which can be easily tuned by adding to, or subtracting from IGZO various cation elements as discussed above, in addition to the various device processing knobs including the processing temperature and atmosphere.

IGZO based TFTs may be used as micro heaters. See e.g., Katsumi Abe, "Simulation Study of Self-Heating and Edge Effects on Oxide-Semiconductor TFTs: Channel-Width Dependence," IDW '2019, p. 461. In addition to micro heaters, IGZO based TFTs may also be used as micro temperature sensors simultaneously. See Hoon Jeong, "Temperature Sensor Made of Amorphous Indium-Gallium-Zinc Oxide TFTs", IEEE Electron Device Letters, 1 Nov. 2013. These properties make IGZO (and other oxide semiconductors with similar attributes) ideally suited for use as "active thermal sensing" pixel elements in the present disclosure. Diode-connected IGZO TFT, in particular, would be an ideal configuration as it behaves just like a two-terminal diode, which could serve simultaneously as a micro heater and a micro temperature sensor when being employed as an active thermal sensing pixel element.

Other semiconductive oxide thin films may be good negative temperature coefficient (NTC) thermistors. Examples of these semiconductive oxides may include metal oxides of manganese, copper, silicon, cobalt, vanadium, nickel, zinc as well as their mixed metal oxides, with room temperature sheet resistance in the range of 5 KΩ/sq to 500 KΩ/sq, and temperature coefficient of resistance (TCR) in the range of −0.5%/K to −20%/K, are also good candidates for thin film devices to function both as micro heaters and micro temperature sensors for the active thermal fingerprint sensor in the present disclosure.

Currently, the FoD market is dominated by optical, ultrasonic, and to a lesser extent, capacitive fingerprint sensor technologies. The optical technology involves placing optical fingerprint sensors either under a display (e.g., LCD or OLED display) or directly into the displays in so-called "in-cell" solution. The in-cell approach has the advantage of larger-area fingerprint sensor by utilizing the thin film transistor (TFT) array process to fabricate the image sensor-either passive pixel sensor (PPS) or active pixel sensor (APS) can be made by integrating TFTs with the photo diode; however, one will need to deal with the difficulty in collecting light signals reflected from the fingerprint ridges and valleys as they tend to be scattered by the display structures including glasses.

There have been many attempts to improve the collection of reflected light signals by making micro optical collimator structures of various kinds such as micro lens, micro tube, or micro pinhole, but the design and manufacturing process for the "in-cell" approach proves to be very difficult, resulting in high costs.

In an "under-display" approach, the fingerprint sensor is placed beneath a display layer such as AMOLED display layer. In the "under-display" approach, optical or ultrasonic technologies are used for capturing and recognition of fingerprint of a user.

The "under-display" solution is also quite challenging, e.g., in the case of OLED display this may necessitate making apertures on the OLED display glass to allow reflected light to reach the optical image sensor underneath the OLED glass, which is not manufacturing friendly and cannot support high fingerprint resolution. The "under-display" solution for LCD is even more challenging since no apertures can be made either on the TFT glass or the CF glass, making light collimation quite difficult. Also, all "under-display" optical sensors face the common disadvantage of losing much of the light signal due to the display glass scattering the light or display pixels blocking the light, which is further exacerbated by the smaller area and more expensive Si-based optical image sensors (CCD or CMOS type) often used under the display.

The ultrasonic fingerprint sensor technology has much narrower application in FoD due to the limitation of ultrasound transmission in display structures—it will not work on any displays where there are air gaps, excluding its application to vast majority of flat panel displays based on rigid LCD or rigid AMOLED. In addition, they only work with very specific screen protector materials with specific thickness, to allow proper ultrasound transmission to generate signals.

Conventional passive-matrix addressed capacitive touch sensors can either detect mutual capacitance signals or self-capacitance signals arising from a finger touch. Mutual capacitive sensors have a capacitor at each intersection of each row (X) and each column (Y). When a finger touches near an intersection, some of the mutual capacitance between the row and column is coupled to the finger which reduces the capacitance at the intersection as measured by the system electronics. Multiple touch points can be uniquely identified by the (X, Y) coordinates of all the touch points. Self-capacitance sensors can have the same X-Y grid as mutual capacitance sensors, but the columns and rows operate independently, and the system electronics measure the current on each electrode to ground. Each electrode forms one plate of a capacitor, with the other plate being either ground or user's finger. A touch causes measured self-capacitance to increase, as the human body "adds" capacitance to that of the system.

However, despite of the stronger signals from self-capacitance sensing, the electronics is only able to uniquely identify the point of one single touch, through capacitance change detected independently for both the row and the column that intersects that particular point. Two-point touch, however, will cause capacitance change to be detected for two rows and two columns, independently, but the system electronics cannot differentiate which set of two points are being touched. Two different sets of two-point touches will cause the same capacitance changes on the two rows and two columns in question.

Conventional passive-matrix addressed mutual capacitive touch sensors are widely adopted for touch sensing solutions requiring relatively coarse resolution (e.g., a few millimeters), due to its multi-touch capability and low cost. With the increase of touch resolution and decrease of touch element size, the parasitic and coupling capacitance goes up drastically while the intended signals from touch element drops precipitously at the same time, making it very difficult to enhance the touch resolution.

Active-matrix addressed self-capacitive touch sensors, on the other hand, offer the advantage of high touch resolution, high touch signal and small parasitic capacitance, as well as the convenience to combine capacitive touch and fingerprint sensing on the same sheet of glass, which can then be directly integrated onto the top of any display glasses.

One of the objective of the present disclosure is to provide new and improved device structures and sensing configurations, as well as manufacturing methods that enable faster, more power efficient and more secure large-area high-resolution fingerprint sensors with built-in anti-spoofing characteristics. It is also one of the objectives of the present disclosure to integrate touch and fingerprint sensors using a combination of capacitive sensing, active thermal and passive thermal fingerprint sensing technologies, to enable stand-alone large-area fingerprint sensors or to enable full-screen FoD to enhance the security and reliability of smart phones and other mobile or fixed electronic devices requiring higher level of security through the use of large-area, high-security fingerprint sensors.

When designing active thermal sensing pixels for fingerprint sensing or sensing of other minute features (e.g., palmprint sensing), two main configurations can be employed, which are described herein.

Configuration 1 combines a micro temperature sensor and a micro heater into a single thin film device within each sensing pixel. In this scenario, the fabrication of the sensor with an array of sensing pixels is more straightforward. If the thin film device employed involves diode or thin film transistor based on IGZO or other types of oxide semiconductor channel materials, it is desirable to have temperature coefficient ($K_{vt}$) of such device fall into the range of between −2 mV/° C. and −200 mV/° C., and more preferably within the range of −10 m V/° C. to −100 mV/° C. It is also desirable to have room temperature sheet resistance of the device semiconductor layer fall into the range of between 5 KΩ/sq and 3 MΩ/sq, and more preferably within the range of 20 KΩ/sq to 500 KΩ/sq. If the thin film device employed involves negative temperature coefficient (NTC) thermistor, it is desirable to have its temperature coefficient of resistance (TCR) fall into the range of −0.5%/K to −20%/K, and more preferably within the range of −1%/K to −10%/K. It is also desirable to have room temperature sheet resistance of the thermistor semiconductor layer fall into the range of between 5 KΩ/sq and 3 MΩ/sq, and more preferably within the range of 20 KΩ/sq to 500 KΩ/sq.

Configuration 2 of active thermal sensing pixel involves fabricating separate micro temperature sensor device and micro heater device for each sensing pixel. In this scenario, although additional device fabrication steps are required, it has the advantage of faster sensor scan speed when low resistance conductor materials such as metals are used as shared micro heater lines for entire rows of sensing pixels, so that active heating can be carried out one row at a time as opposed to one pixel at a time in Configuration 1.

The micro temperature sensor device in this scenario can be diode or thin film transistor based on IGZO or other types of oxide semiconductor channel materials. It is desirable to have its temperature coefficient ($K_{vt}$) fall into the range of between −2 m V/° C. and −200 mV/° C., and it is also desirable to have room temperature sheet resistance of the device semiconductor layer fall into the higher end of the known range of interest, e.g., between 200 KΩ/sq and 10 GΩ/sq.

The micro temperature sensor device in this scenario can also be negative temperature coefficient (NTC) thermistor, and it is desirable to have its temperature coefficient of resistance (TCR) fall into the range of −2%/K to −20%/K, and it is also desirable to have room temperature sheet resistance of the thermistor semiconductor layer fall into the higher end of the known range of interest, e.g., between 200 KΩ/sq and 3 MΩ/sq.

Higher sheet resistance is preferred in order to eliminate or minimize any self-heating effects associated with the micro temperature sensor in Configuration 2. This will allow Configuration 2 of the active thermal sensing pixel to also function as passive thermal sensing pixel when the row-shared micro heater line is turned off during sensor operation, since very little heat will be generated when the micro temperature sensor is activated to measure the temperature difference in the ridge and valley regions of the fingerprint. Consecutively scanned images using passive thermal sensing operation and active thermal sensing operation creates thermal images with reversed gray scale in the ridge and valley regions of the fingerprint, at least under the most common scenarios where human body temperature is higher than the surrounding environment, and this distinct feature enables highly desirable anti-spoofing capabilities for fingerprint sensors constructed with Configuration 2.

In accordance with some embodiments, the present disclosure provides large-area biometric (such as fingerprint) sensor on glass or flexible substrate with capacitive touch sensing and active thermal fingerprint sensing integrated into one monolithic sheet, with the sensing pixels in the active thermal fingerprint sensing area comprising two-terminal devices such as diodes, diode-connected TFTs or thermistors, or three-terminal devices such as thin film transistors, based on oxide semiconductor. The oxide semiconductor is used as a channel material in TFTs (or in diodes or thermistors) in some embodiments. Examples of a suitable oxide semiconductor include, but are not limited to amorphous or crystalline indium gallium zinc oxide (IGZO) or modified IGZO. Incorporating additional cation elements into, or replacing the existing cation elements in IGZO with, elements such as Al, Sn, Ti, Ta, Zr, Co, Ni, Hf, Si, F, Ge, and rare earth elements such as Y and La, enhances the TFT temperature stability. A moderate TFT temperature stability is achieved to balance the need for active thermal sensing (the less stable the better) and environmental stability. To utilize the relatively lower stability of the oxide semiconductor materials for active thermal sensing is a unique approach in the present disclosure and also provide surprisingly good results in the biometric sensing device as described herein.

The substrate used herein for TFT fabrication include, but are not limited to, glass and glass-supported polyimide substrate. In the manufacturing process and devices described herein eliminates the need to use or touch silicon wafer based TFTs because silicon wafter based TFTs are too small in size and also too expensive.

In the present disclosure, the active thermal biometric sensor comprises an oxide semiconductor material as described herein. For example, in some embodiments, the oxide semiconductor material is used as in channels of thin film transistors in the biometric sensor. In some embodiments, the oxide semiconductor material is used in thermistors or diodes in the biometric sensor, for example, used as a channel material. The temperature sensitivity (regarded as instability) of the oxide semiconductor such as IGZO and modified IGZO is utilized in the disclosure to provide surprisingly good results because the TFTs, diodes or thermistors containing the oxide semiconductor can be used as micro temperature sensors, micro heaters, or combinations of both micro temperature sensors and microheaters, especially in the active thermal sensing.

Further, the optical transparency of the oxide semiconductor is also utilized especially for both sensing and displaying applications. The oxide semiconductor may have a transmittance of visible light in a range from 50% to 99.9%, for example, from 50% to 98%, 60% to 98%, 70% to 98%, 80% to 99%, 80% to 98%, 80% to 95%, or any other suitable ranges. The devices such as FoD devices provided in the present disclosure may have an aperture ratio higher than 50%, for example, higher than 60%, higher than 70%, higher than 80%, or higher than 90$. An aperture ratio refers to the ratio of the light-sensitive area of a pixel to its total area. A higher aperture ratio means more light is emitted in a given display area.

The oxide semiconductor may be amorphous or has a crystalline or polycrystalline structure.

In the present disclosure, the TFTs comprising an oxide semiconductor are for active thermal sensing. The transistors driving a sensor matrix or in peripheral circuits need to be thermally stable and insensitive to temperature, and, for example, are preferably low temperature polysilicon (LTPS) based in some embodiments, unless expressly stated otherwise.

The sensor and resulting device comprising an oxide semiconductor may be operated in either or both of two configurations including Configuration 1 and Configuration 2 as described herein.

In Configuration 1, the two-terminal or three-terminal device functions both as a micro heater and a micro temperature sensor in each sensing pixel.

In Configuration 2, the two-terminal or three-terminal device functions as micro temperature sensor only at each pixel, with separate micro heater (e.g., based on metals) independently fabricated and shared with an entire row of sensing pixels.

Enhanced anti-spoofing capability of the fingerprint sensor can be realized in Configuration 2, when fingerprint images are acquired both in "active thermal sensing" mode (micro heaters turned on), and "passive thermal sensing" mode (micro heaters turned off), through comparison and contrast analysis of fingerprint images acquired in the two different modes.

The present disclosure further discloses two-terminal or three-terminal devices based on oxide semiconductors, for example, diodes, thin film transistors, diode-connected thin film transistors and thermistors etc., to function simultaneously as micro heater and micro temperature sensor for each pixel of the active thermal fingerprint sensor. Optionally, additional micro heater can be made of transparent conducting oxide (TCO) such as ITO or ZnO: Al, for applications in either stand-alone fingerprint sensors, or FoD.

Non-oxide materials such as silicon carbide, tin selenide, tantalum nitride, or polysilicon can also be used to form thermistors or diodes to simultaneously function as micro heater and micro temperature sensor, optionally with additional micro heater made of Ag, Al, Au, CNT, Cr, CrN, Cu, ITO, ZnO: Al, Ni, NiCr, Pt, Si nanowire, SiC, Sn, $SnO_2$, $Ta_2O_5$, Ti, W and their various combinations, in applications of stand-alone active thermal fingerprint sensors.

The top surface of the sensor can be protected by either transparent or non-transparent hard coating, and the said large-area fingerprint sensor is optionally capable of size and resolution configurable capacitive and thermal scan.

The present disclosure also provides combining lower cost, faster and coarser grid passive-matrix addressed mutual capacitive touch sensor with finer grid active thermal fingerprint sensor and transparent hard coating for integration onto the top surface of any type of display panel to enable multi-touch sensing function using the coarser capacitive grid and fingerprint sensing function using the finer active thermal grid in the same display.

The present disclosure also provides combining fine-grid active-matrix self-capacitive touch and fingerprint sensor with fine-grid active thermal fingerprint sensor to enhance fake-finger rejection rate and ensure high security of the fingerprint sensor. Fake-finger materials need to have a set of certain electrical, mechanical and surface energy properties close enough to those of human fingers to spoof the capacitive fingerprint sensor, but a different set of electrical, mechanical and surface energy properties on top of very unique thermal properties to spoof the active thermal fingerprint sensor, and therefore the chances of fake-finger materials being able to spoof both capacitive type and active thermal type fingerprint sensors are significantly reduced.

The present disclosure also provides combining active-matrix addressed self-capacitive touch sensor with transparent hard coating for integration on the top surface of any type of display panel to enable multi-touch sensing function using a coarser grid self-capacitive scan and fingerprint sensing function using a finer grid active thermal scan in the same display. Transparent oxide semiconductors such as IGZO etc. are used as channel materials for the in-pixel switching TFTs, and transparent conducting oxides (TCO) such as ITO can be used as the electrodes for the self-capacitive sensing pixel elements. LTPS TFT or oxide semiconductor (e.g., IGZO) based TFT peripheral circuits for coarse-grid touch sensing and fine-grid fingerprint sensing can be fabricated on the sensor substrate to minimize the number of external connections to the application-specific integrated circuits (ASIC).

The present disclosure also provides in-cell fingerprint and touch sensors integrated into the TFT backplane of active matrix emissive displays such as AMOLED, Micro LED display, and electroluminescent quantum dot display such as quantum-dot light-emitting diodes or QD-LED). The touch sensor can be based on either passive matrix mutual capacitive principle or active matrix self-capacitive principle. The fingerprint sensor is based on active thermal principle, optionally combined with passive thermal sensing. TFTs based on either transparent oxide semiconductors or non-transparent LTPS can be used to drive display pixels or self-capacitance pixels, and transparent conducting oxides (TCO) such as ITO, or non-transparent metals can be used as capacitive touch electrodes.

The present disclosure also provides touch sensor and fingerprint sensor on display system which is capable of size (or area) and resolution configurable capacitive and thermal scan to save the scan time and power consumption.

Different examples of the biometric sensor 100 provided in the present disclosure are illustrated in FIGS. 1A-10D and are described herein. In each sensor or device, a plurality of pixels comprise thermal sensing pixels configured to operate based on at least the active thermal sensing principle, in which a low power heat pulse is applied and a response corresponding to a biometric pattern is measured.

In some embodiments, each pixel array comprises a plurality of pixels arranged in a plurality of rows and a plurality of columns. Each pixel array comprises thermal sensing pixels, which are configured to operate based on at least the active thermal sensing principle, in which a low power heat pulse is applied to each pixel array and a response corresponding to a biometric pattern is measured. For thermal sensing, a pixel in each pixel array may comprise one or more diodes connected in series between a pixel row line and a pixel column line.

In the present disclosure, the pixels based on active thermal sensing comprises an oxide semiconductor materials as described herein.

In accordance with some embodiments, each pixel array further comprises a capacitive sensing grid comprising capacitive sensing nodes distributed in each pixel array. The capacitive sensing grid is configured to detect a presence of the object, and/or rolling motion and location of the object. The capacitive sensing nodes may be mutual capacitance sensing nodes or self-capacitance sensing nodes. The self-capacitance sensing nodes are configured to be passive-matrix addressed, or active-matrix addressed by an array of thin film transistors. The mutual capacitance sensing nodes are configured to be passive-matrix addressed.

FIGS. 1A-1B illustrate an exemplary fingerprint sensor array 102 with combined micro temperature sensors and micro heaters within each pixel (Configuration 1), in accordance with some embodiments. The fingerprint sensor array 102 is one example of a biometric sensor 100.

Referring to FIGS. 1A-1B, a sensor layer 40 (or called sensing layer) is disposed above a substrate 30 (or called sensor substrate). Examples of the substrate 30 include, but are not limited to, glass and polyimide-coated glass. The substrate can be a flexible subtrate.

The sensor layer 40 comprises a pixel matrix having a plurality of pixels, which are configured to measure a biometric pattern, for example, of a finger 2 including ridges and valleys. The sensor layer 40 comprises a micro temperature sensor, a micro heater, or a combination thereof in each pixel. In the configuration illustrated in FIGS. 1A-1B, the sensor layer 40 comprises a combination 41 of micro temperature sensor and micro heater within each pixel.

Examples of the micro temperature sensor, the micro heater, or a combination thereof is selected from a two-terminal such as a thermistor and a diode, or a three-terminal device such as a thin film transistor (TFT). The micro temperature sensor, the micro heater, or a combination thereof comprises an oxide semiconductor material as described herein. For example, the oxide semiconductor material is used as a channel in a TFT. Oxide semiconductor material can also be used to make a thermistor or diode. The oxide semiconductor material such as IGZO or modified IGZO can be used as a channel material. TFT, diode, thermistor, or a combination thereof can be used as a combination 41 of temperature sensor and micro heater. Diode-connected TFT is preferred when IGZO or modified IGZO is used as semiconductor material.

In some embodiments, the microheater may be made of a conductive material such as metal other than the oxide semiconductor material. Metals and other highly conductive materials can only be used as microheater, and they are typically not good temperature sensors, so they can only be used when microheater and temperature sensor are separate, instead of being combined.

In this configuration of FIGS. 1A-1B, the fabrication of the sensor with an array of sensing pixels is more straight-forward. If the thin film device employed involves diode or thin film transistor based on IGZO or other types of oxide semiconductor channel materials, it is desirable to have temperature coefficient ($K_{vt}$) of such device fall into the range of between −2 mV/° C. and −200 mV/° C., and more preferably within the range of −10 mV/° C. to −100 mV/° C. It is also desirable to have room temperature sheet resistance of the device semiconductor layer fall into the range of between 5 KΩ/sq and 10 GΩ/sq, and more preferably within the range of 50 KΩ/sq to 1 GΩ/sq. If the thin film device employed involves negative temperature coefficient (NTC) thermistor, it is desirable to have its temperature coefficient of resistance (TCR) fall into the range of −0.5%/K to −20%/K, and more preferably within the range of −1%/K to −10%/K. It is also desirable to have room temperature sheet resistance of the thermistor semiconductor layer fall into the range of between 5KΩ/sq and 3MΩ/sq, and more preferably within the range of 20KΩ/sq to 500KΩ/sq.

Figure 2B:
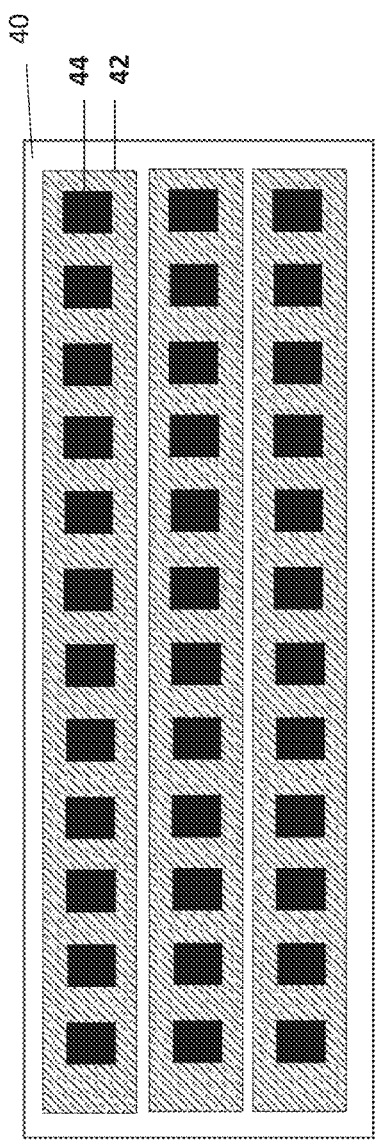
FIG. 2B is a top plan view illustrating three exemplary rows of the exemplary fingerprint sensor array of FIG. 2A.

FIGS. 2A-2B illustrate an exemplary fingerprint sensor array 104 with separate micro temperature sensors and micro heater lines (Configuration 2) in accordance with some embodiments. The fingerprint sensor array 104 is one example of a biometric sensor 100.

Referring to FIGS. 2A-2B, a sensor layer 40 is disposed above a substrate 30. The sensor layer 40 comprises a pixel matrix having a plurality of pixels, which are configured to measure a biometric pattern, for example, of a finger 2. In the sensor layer 40, the micro temperature sensors and the micro heaters are separate from each other. For example, as illustrated in FIGS. 2A-2B, the sensor layers comprises micro heater lines 42, and pixels comprising micro temperature sensors 44. Each micro heater line 42 is disposed below a row of pixels comprising micro temperature sensors 44. The micro heater line 42 may be made of a metal or other conductive material. The micro temperature sensors 44 may be TFTs, diodes, thermistors, or any combination thereof and comprises an oxide semiconductor material.

In this configuration as illustrated in FIGS. 2A-2B, although additional device fabrication steps are required, it has the advantage of faster sensor scan speed when low resistance conductor materials such as metals are used as shared micro heater lines for entire rows of sensing pixels, so that active heating can be carried out one row at a time as opposed to one pixel at a time in Configuration 1. The micro temperature sensor device in this configuration can be diode or thin film transistor based on IGZO or other types of oxide semiconductor channel materials. It is desirable to have its temperature coefficient ($K_{vt}$) fall into the range of between −2 mV/° C. and −200 mV/° C., and it is also desirable to have room temperature sheet resistance of the device semiconductor layer fall into the higher end of the known range of interest, e.g., between 200 KΩ/sq and 10 GΩ/sq.

The micro temperature sensor device in Configuration 2 as illustrated in FIGS. 2A-2B can also be negative temperature coefficient (NTC) thermistor. It is desirable to have its temperature coefficient of resistance (TCR) fall into the range of −2%/K to −20%/K, and it is also desirable to have room temperature sheet resistance of the thermistor semiconductor layer fall into the higher end of the known range of interest, e.g., between 200 KΩ/sq and 3 MΩ/sq. Higher sheet resistance is preferred in order to eliminate or minimize any self-heating effects associated with the micro temperature sensor in Configuration 2. This will allow Configuration 2 of the active thermal sensing pixel to also function as passive thermal sensing pixel when the row-shared micro heater line is turned off during the sensor operation, since very little heat will be generated when the micro temperature sensor is activated to measure the temperature difference in the ridge and valley regions of the fingerprint.

Under most common scenarios where live human finger temperature is higher than that of the surrounding environment and the fingerprint sensor, consecutively scanned fingerprint images using passive thermal sensing operation and active thermal sensing operation creates thermal images with reversed gray scale in the ridge and valley regions of the fingerprint, and this distinct feature enables highly desirable anti-spoofing capabilities for fingerprint sensors constructed with Configuration 2.

During passive thermal sensing operation, fake or dead fingers are highly unlikely to possess the same temperature distribution (or temperature map) as live humans along the ridges and valleys of the fingerprints. Even if attempts are made to warm up (when the environment is colder than body temperature) or cool down (when the environment is warmer than body temperature) the fake or dead fingers to match the body temperatures of live humans, thermal conductivity difference between the live human finger skin and the fake or dead finger skin means that heat transfer rate and thus the dynamic temperature distributions (or temperature maps) of the fingerprint ridges and valleys of live humans will be very different than those of the fake or dead fingers, allowing the latter to be easily screened out by multiple scans at predetermined time intervals, either by passive thermal scans alone or by active thermal scans alone, or by a combination of passive thermal scans and active thermal scans at predetermined time intervals.

Figure 3:
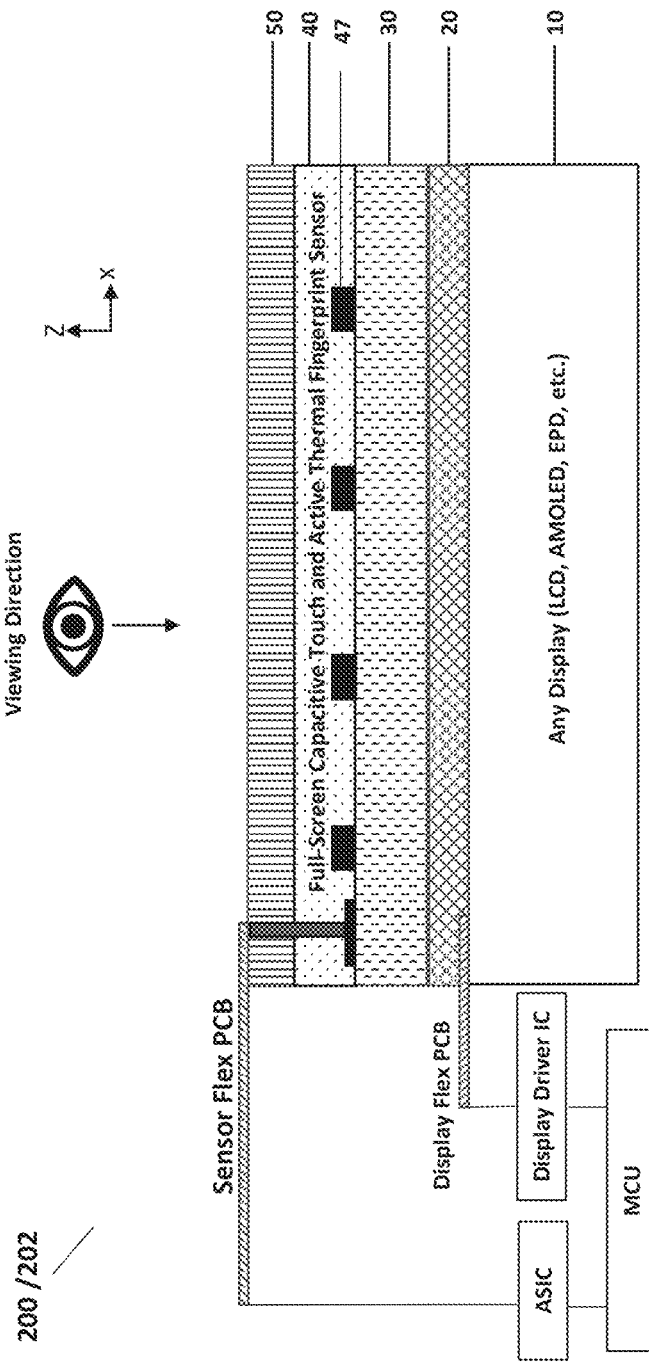
FIG. 3 is a sectional view illustrating an exemplary device with out-cell fingerprint sensor on display (FoD) structure based on capacitive touch and active thermal fingerprint sensors in accordance with some embodiments.

FIG. 3 illustrates an exemplary device 202 with out-cell fingerprint sensor on display (FoD) structure based on capacitive touch and active thermal fingerprint sensors, in accordance with some embodiments. The exemplary device 202 is an example of device 200.

Referring to FIG. 3, the exemplary device 202 comprises a display layer 10 configured to display information, a thin adhesive layer 20 disposed on the display layer 10, a sensor substrate 30 disposed on the adhesive layer 20, and a sensor layer 40 disposed over the sensor substrate 30. The adhesive layer is made of an optically clear adhesive (OCA) with acceptable clarity so that the information displayed can be seen from a top surface of the device. A transparent hard coating 50 may be disposed on the sensor layer 40.

In some embodiments, each of the sensors in FIGS. 1A-1B and 2A-2B further comprises capacitive touch sensing elements as described herein. The capacitive touch sensing elements are self-capacitive or mutual capacitive, and are active matrix or passive matrix. For example, the capacitive touch sensing elements are passive matrix mutual capacitive touch sensors or active matrix self-capacitive touch sensors in some embodiments.

The sensor has excellent anti-spoofing performance. For example, as described herein, in some embodiments, the capacitive touch sensing elements are active matrix self-capacitive touch sensors used in combination with active thermal sensing to enhance anti-spoofing performance. For another example, as described herein, the thermal sensing pixels comprises pixels for passive thermal sensing in combination with active thermal sensing to enhance anti-spoofing performance.

The sensors in FIGS. 1A-1B and 2A-2B are applicable to the active thermal layer in the FOD devices as shown in FIGS. 3-8B. FIGS. 1A-1B and 2A-2B illustrate stand-alone biometric such as fingerprint sensors in some embodiments, while FIGS. 3-8B illustrate the FoD devices in some embodiments. The sensors in FIGS. 1A-1B and 2A-2B can be used in the active thermal layer in the FOD devices. So different combinations of the sensors in FIGS. 1A-1B and 2A-2B and the devices in FIGS. 3-8B. In each device, the biometric sensor may be operated based on the active thermal principle and optionally in combination with the passive thermal principle to increase anti-spoofing performance. The transparent nature of the oxide semiconductor material such as IGZO or modified IGZO used in these fingerprint sensors makes it ideally suited for the out-cell type FoD as the oxide semiconductor material does not block the light emitted from the display.

FIG. 3 illustrates an embodiment of a device 200 having an FoD structure provided in the present disclosure.

Figure 7A:
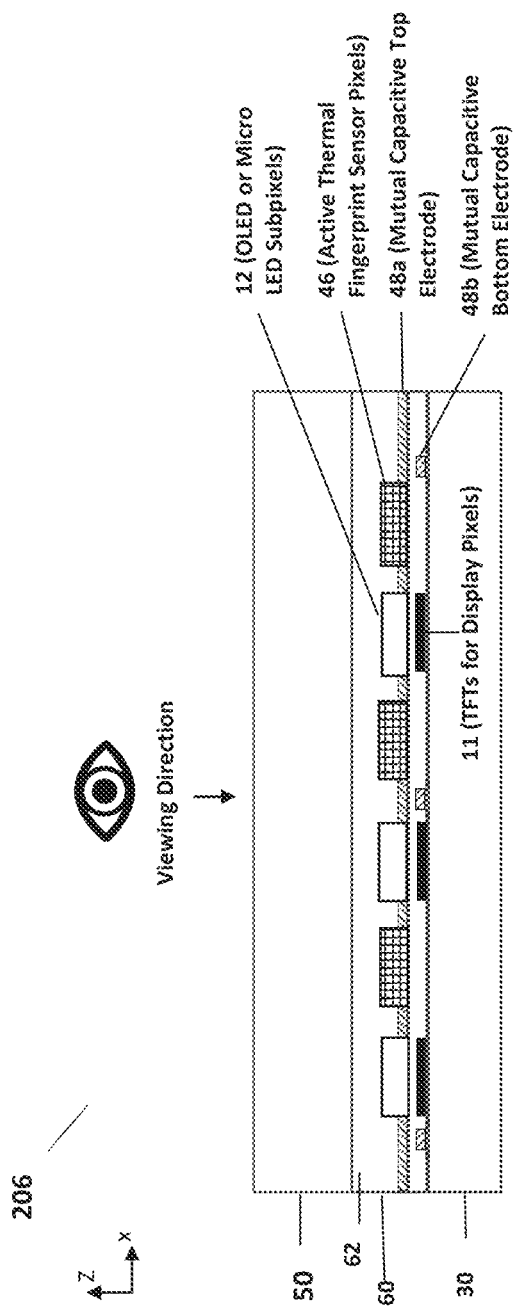
FIG. 7A is a sectional view illustrating an exemplary device having in-cell type side-by-side top-emitting OLED or micro LED with coarse-grid mutual capacitive touch and fine-grid active thermal fingerprint sensors in accordance with some embodiments.
Figure 7B:
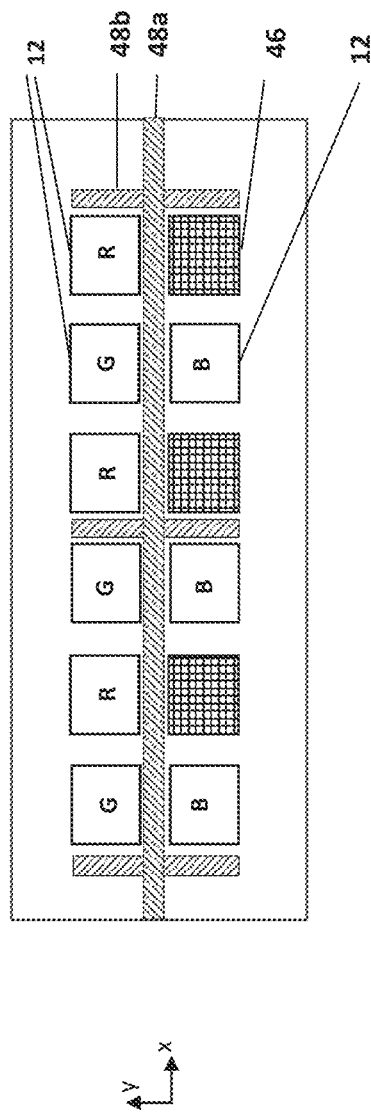
FIG. 7B is a plan (top) view illustrating the partial row of the sensor array in the exemplary device of FIG. 7A illustrating the density of emitter pixels, mutual capacitive touch pixels and active thermal sensing pixels in accordance with some embodiments.

In FIG. 3, the sensor structure, which includes the sensor substrate 30 and the sensor layer 40, is disposed over the display layer 10. The adhesive layer 20 can be disposed over between the sensor substrate 30 and the display layer 10. A transparent hard coating 50 is disposed over the sensor layer 40. The display layer 10 is configured for display and may include any suitable structure, for example, liquid crystal display (LCD), active matrix light emitting diodes (AMOLED), electronic paper display (EPD), or any other suitable display. The glue layer 20 comprises an optical clear adhesive, which is suitable for display applications. It may comprise a curable polymer, which will be cured in the device. As illustrated in FIG. 3, the sensor layer 40 include a pixel matrix 47 including active thermal sensing pixels 46 and capacitive tough and finger sensing pixels 48. The pixel matrix is illustrated in black blocks in FIG. 3 and are illustrated further in FIGS. 4A-4B. More details are illustrated in FIGS. 7A-7B in the context of in-cell FoD.

In the sensor layer 40, transparent oxide semiconductor based micro heater and sensor arrays can be used for lower power active pixels. Transparent conductive oxide (TCO) such as ITO can be used for mutual capacitive or self-capacitive sensing electrodes. Transparent oxide semiconductor based TFT (IGZO etc.) can be used for switching active-matrix self-capacitance pixel electrodes.

Such FoD structure as illustrated in FIG. 3 is based on capacitive touch sensing in combination with active thermal fingerprint sensing. Such an exemplary device includes full-screen capacitive touch and active thermal fingerprint sensing with TFT peripheral circuits for driving and signal reading. There are two types of Scenarios for the exemplary device in FIG. 3, including Scenario 1: coarse-grid passive-matrix mutual capacitive touch and fine-grid active thermal fingerprint sensing; and Scenario 2: fine-grid active-matrix self-capacitive touch and fingerprint sensing, plus fine-grid active thermal fingerprint sensing to enhance fake-finger rejection capability.

In Scenario 1, full-screen passive-matrix mutual capacitive touch sensing is employed to enable reliable and low-cost multi-touch location sensing capability, while full-screen active thermal fingerprint sensing is employed to ensure capture of high-quality fingerprint image. Low temperature polysilicon (LTPS) TFT or oxide semiconductor (e.g., IGZO) TFT peripheral circuits can be used for driving and signal reading for both coarser mutual capacitive touch and finer active thermal fingerprint sensors, to minimize the number of external connections to the application-specific integrated circuits (ASIC).

In Scenario 2, fine-grid active-matrix self-capacitive touch and fingerprint sensing is combined with fine-grid active thermal fingerprint sensing to enhance fake-finger rejection capability, since it is much harder to find a fake finger material that can meet both capacitive sensing and thermal sensing requirements in either dry or wet condition like human finger skin. Active-matrix addressed self-capacitive sensors consist of a self-capacitance electrode for each matrix pixel of the sensing area which can be independently switched on or off by an in-pixel thin film transistor (TFT), which offer the advantage of high touch sensing resolution, large touch signal and small parasitic capacitance, as well as the convenience to combine full-screen capacitive touch location sensing with fingerprint sensing using the same array of sensing pixels.

To ensure good viewing of display content, transparent oxide semiconductor based thin film micro heaters and micro temperature sensors are used to construct the active thermal fingerprint sensing array. Oxide semiconductors with suitable composition and sheet resistance are known to be excellent micro heaters and micro temperature sensors simultaneously, facilitating fabrication of two-terminal devices (e.g., diodes or thermistors) or three-terminal devices (e.g., thin film transistors) to function both as heaters and temperature sensors at the same time, to provide low power active thermal fingerprint sensing pixels.

Examples of such thin film oxide semiconductors for two-terminal devices include zinc oxide (with or without doping of transition metals such as cobalt or nickel), titanium oxide, zinc titanium oxide or titanium zinc oxide. Other semiconductive oxide thin films known to be good negative temperature coefficient (NTC) thermistors, such as metal oxides of manganese, copper, silicon, cobalt, vanadium, nickel, zinc as well as their mixed metal oxides, with room temperature sheet resistance in the range of 5KΩ/sq to 500KΩ/sq, and temperature coefficient of resistance (TCR) in the range of −0.5%/K to −20%/K, are also good candidates for thin film devices to function both as micro heaters and micro temperature sensors for the active thermal fingerprint sensor. Transparent conducting oxides (TCO) such as ITO can be used as the top and bottom electrodes for the mutual capacitive touch sensing elements in Scenario 1, as well as the single electrodes for the self-capacitive touch and fingerprint sensing pixel elements in Scenario 2. A transparent hard coating is fabricated on the top of the touch and fingerprint sensors in either Scenario 1 or Scenario 2 to ensure better signals for capacitive and thermal sensing, resulting in much better signal to noise ratio (SNR) and fingerprint image quality compared to other technologies of prior arts which use cover glass for protection. Examples of a suitable transparent hard coating include, but are not limited to, nitride-based SiNx, BN, AlN, and any combination thereof.

Figure 4A:
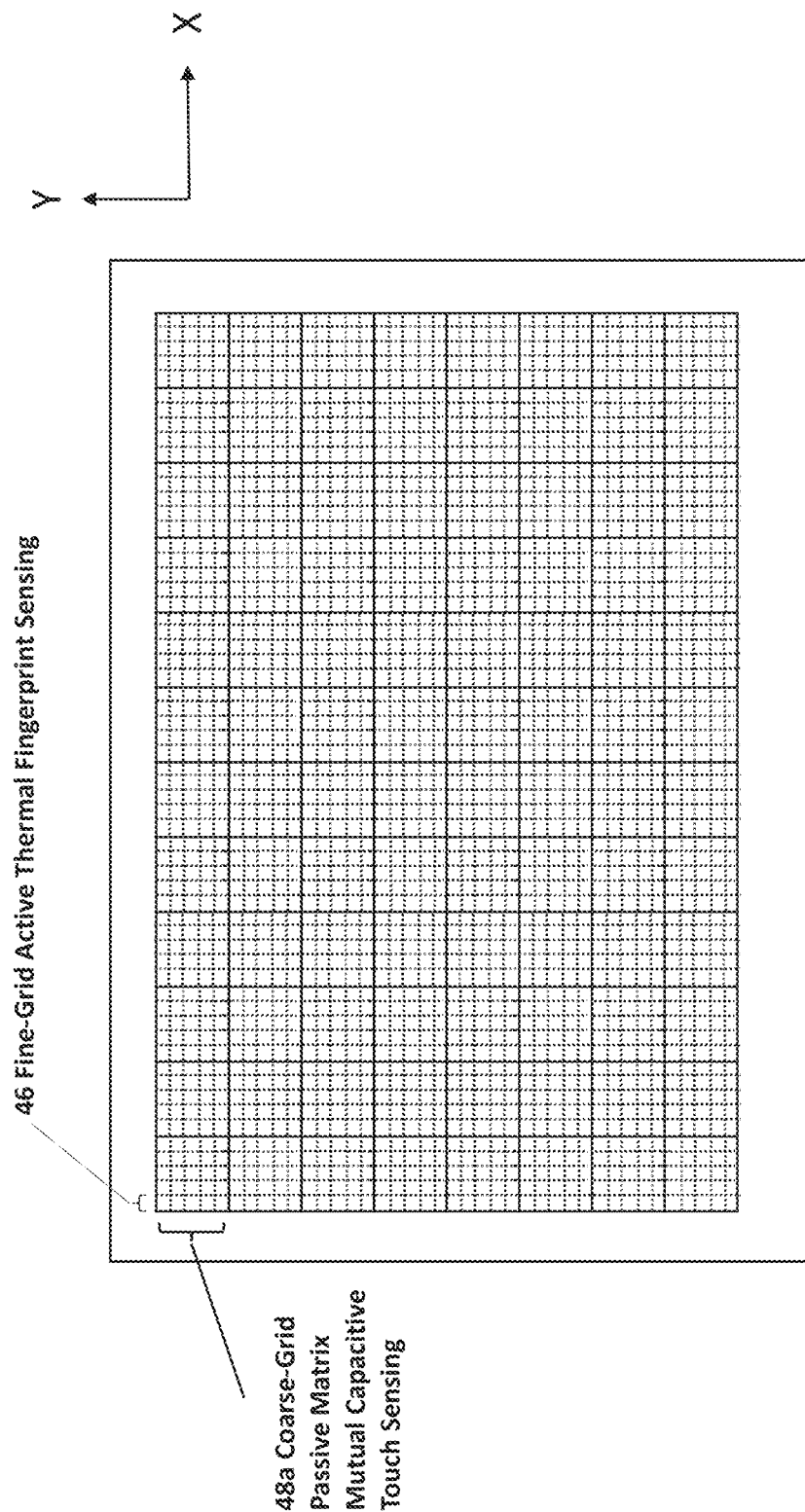
FIG. 4A is a plan view illustrating one example of the exemplary device of FIG. 3, having coarse-grid passive matrix mutual capacitive touch and fine-grid active thermal fingerprint sensors (Scenario 1) in accordance with some embodiments.

FIG. 4A illustrates one example of the exemplary device of FIG. 3, having coarse-grid passive matrix mutual capacitive touch sensing and fine-grid active thermal fingerprint sensors (scenario 1) in accordance with some embodiments. FIG. 4A illustrates the top view of Scenario 1 of FIG. 3, showing coarse-grid passive matrix mutual capacitive touch sensing in combination with fine-grid active thermal fingerprint sensing. The coarse-grid capacitive touch allows for fast detection of finger touch location which then triggers the high-resolution scan by the active thermal fingerprint sensor only in the area of finger contact, thereby saving the total scan time and power consumption needed for fingerprint sensing anywhere in the whole screen area.

Figure 4B:
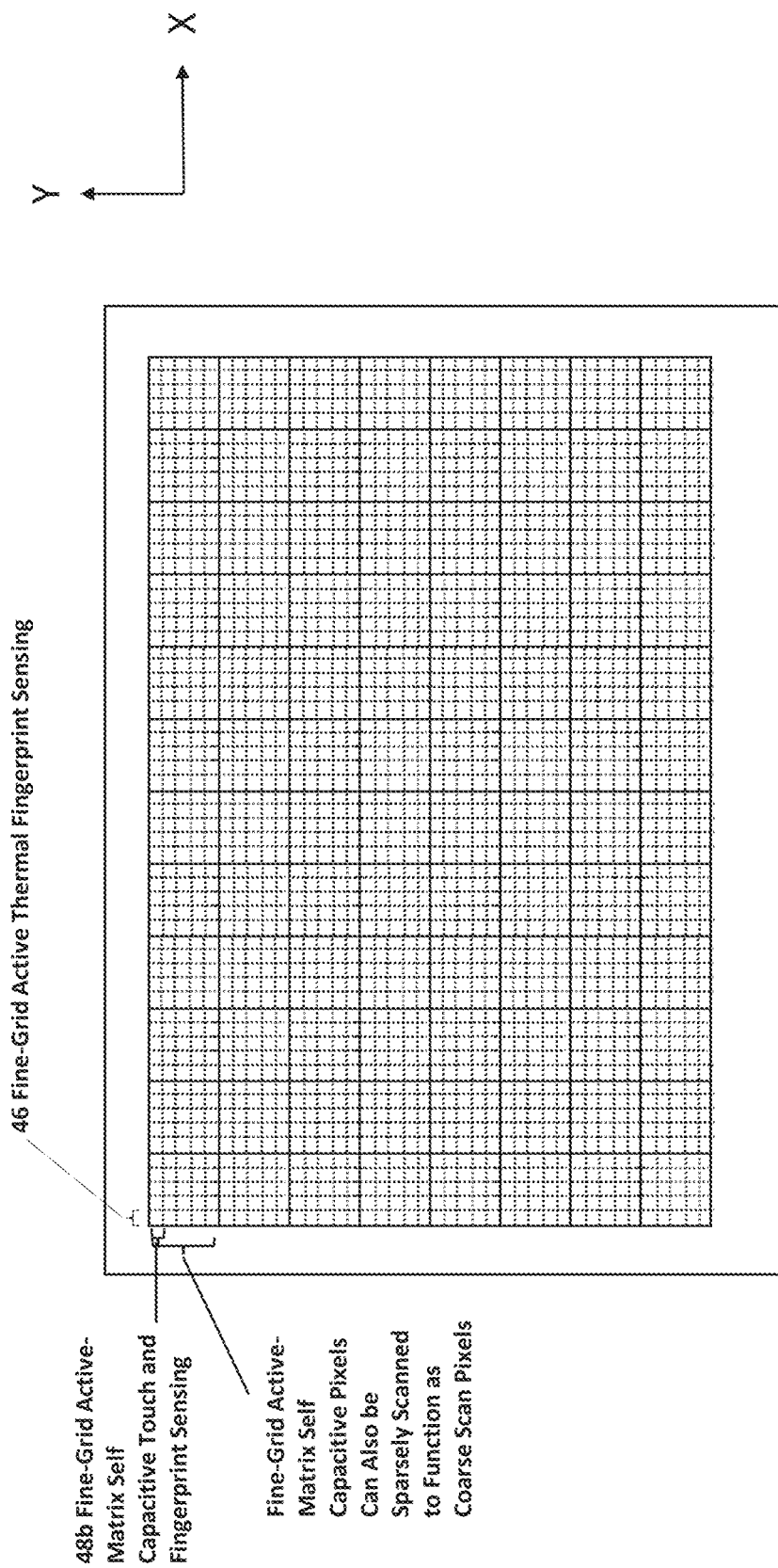
FIG. 4B is a plan view illustrating another example of the exemplary device of FIG. 3, having fine-grid active-matrix self-capacitive touch and fingerprint sensors and fine-grid active thermal fingerprint sensors (Scenario 2) in accordance with some embodiments.

FIG. 4B illustrates another example of the exemplary device of FIG. 3, having fine-grid active-matrix self-capacitive touch and fingerprint sensors and fine-grid active thermal fingerprint sensors (scenario 2) in accordance with some embodiments. FIG. 4B illustrates the top view of Scenario 2 of FIG. 3, showing fine-grid active-matrix self-capacitive touch and fingerprint sensors in combination with fine-grid active thermal fingerprint sensors. Although the active-matrix self-capacitance pixels are physically constructed to form a fine-grid, the fine-grid active-matrix self-capacitive pixels can either be scanned line by line, in which case both location touch sensing and fingerprint sensing functions can be realized at the same time, or alternatively, the self-capacitive pixels can also be scanned sparsely (i.e., by skipping lines) to function as coarse scan touch sensing pixels only. The exemplary device having the configuration of FIG. 4B has higher resolution compared to that of FIG. 4A.

Transparent hard coating 50, for example, nitride-based thin film coating, can be used to ensure much better signals (capacitive and thermal) and thus much better SNR and fingerprint image quality than other competing technologies.

In some embodiments, in the sensor layer, the pixel matrix may be separate segments logically divided in the pixel matrix, and can be separately controlled. The device 200 such as the exemplary devices 202, 204, 206, and 208 comprising FOD structures further comprises other components such as a plurality of application-specific integrated circuits (ASICs) coupled to the sensor layer 40. Each ASIC is connected with the sensor layer 40 through sensor flex printed circuit board (PCB) and conductive pads. Each ASIC is configured to capture image data of a biometric pattern of an object measured by at least one pixel array. Each pixel array is configured to be independently driven and scanned by one or more of the plurality of the ASICs.

The device 200 may further comprise one or more display diver integrated circuits (IC) and display flex PCB, which are connected with the display layer 10.

A microcontroller unit (MCU) may be coupled to the plurality of ASICs and display driver ICs. The MCU comprises one or more processor and at least one tangible, non-transitory machine readable medium encoded with one or more programs configured to process the image data, display information, and/or control operation of the device 200 or a system comprising the device 200.

The sensor may further comprise a plurality of supporting circuits. Each pixel array is connected with at least one supporting circuit. In some embodiments, the sensor in the system may further comprise a plurality of switches. Each switch is connected with one or more supporting circuits and one or more ASICs. Each pixel array is configured to be independently driven and scanned by one or more of the plurality of the ASICs through one or more switches.

Figure 5:
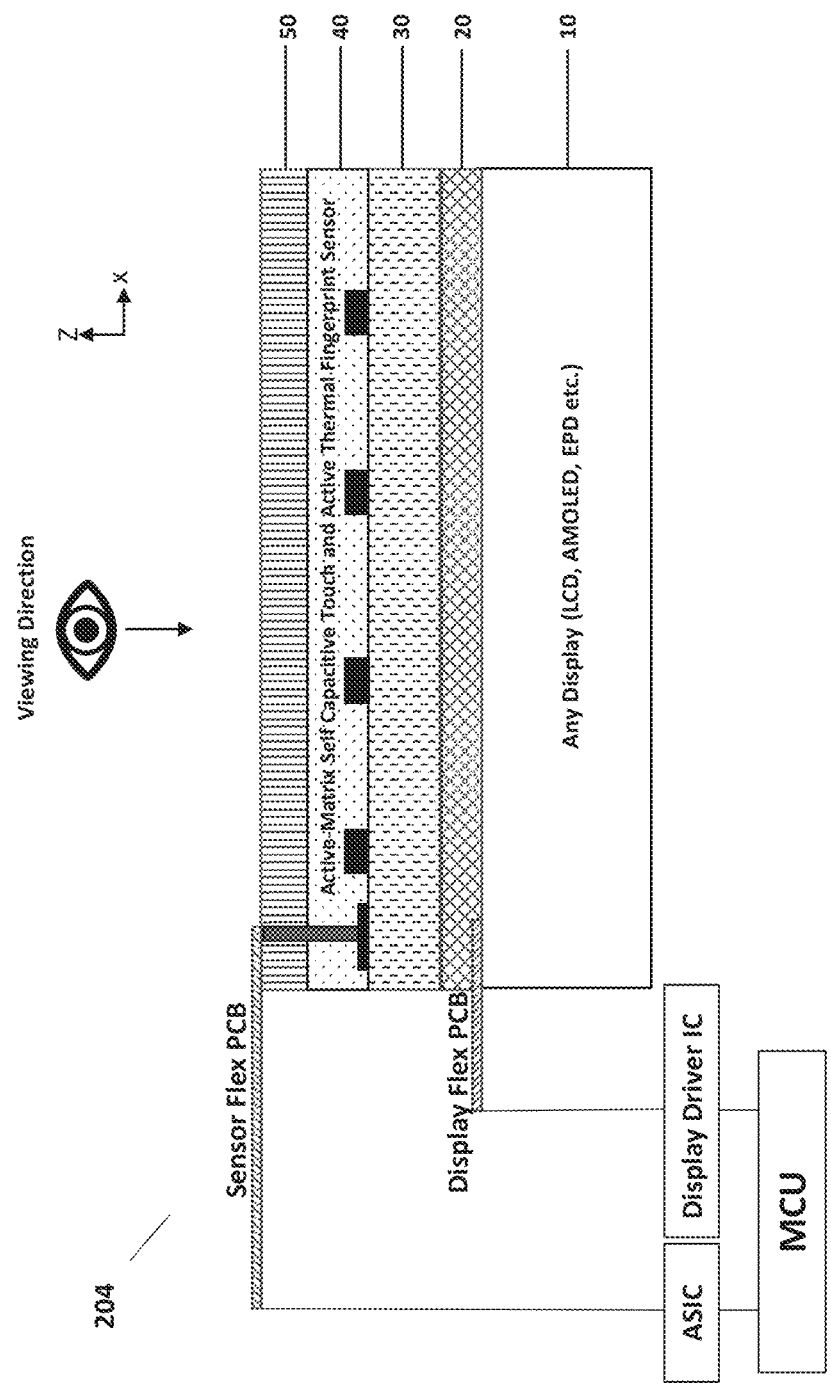
FIG. 5 is a sectional view illustrating an exemplary device having out-cell FoD structure based on active-matrix self-capacitive touch and active thermal fingerprint sensors in accordance with some embodiments.

FIG. 5 illustrates another embodiment of an exemplary device 204 having out-cell FoD structure, which is based on active-matrix self-capacitive touch and active thermal fingerprint sensors, in accordance with some embodiments. The exemplary device 204 is an example of device 200. The FoD structure is based on active-matrix addressed self-capacitance pixels for touch sensing and active thermal pixels for fingerprint sensing. LTPS TFT or oxide semiconductor (e.g., IGZO) based TFT peripheral circuits for coarse-grid touch sensing and fine-grid fingerprint sensing can be fabricated on the sensor substrate to minimize the number of external connections to the application-specific integrated circuits (ASIC).

To ensure good viewing of display content, transparent oxide semiconductors (e.g., IGZO etc.) are used as channel materials for the in-pixel switching TFTs, and transparent conducting oxides (TCO) such as ITO can be used as the electrodes for the self-capacitive sensing pixel elements. Transparent hard coating (e.g., nitride-based SiNx, BN or AlN etc.) is fabricated on the top of the touch and fingerprint sensors to ensure better signals for capacitive sensing, resulting in much better signal to noise ratio (SNR) and fingerprint image quality compared to other technologies of prior arts which use cover glass for protection.

Referring to FIG. 5, full-screen active-matrix self-capacitive touch sensors and active thermal fingerprint sensors are on top of any display. The sensor structure, which includes the sensor substrate 30 and the sensor layer 40, is disposed over the display structure layer 10. A glue layer 20 can be disposed over between the sensor substrate 30 and the display layer 10. A transparent hard coating 50 is disposed over the sensor layer 40.

TFT peripheral circuits are used for coarser touch sensing and finer fingerprint sensing. In the sensor layer 40, transparent oxide semi based in-pixel TFT (IGZO etc.) and transparent self-capacitance electrode (ITO etc.) can be used.

The transparent hard coating, for example, a nitride-based thin film coating, is used to ensure much better signals and thus much better SNR and fingerprint image quality than other competing technologies.

Figure 6:
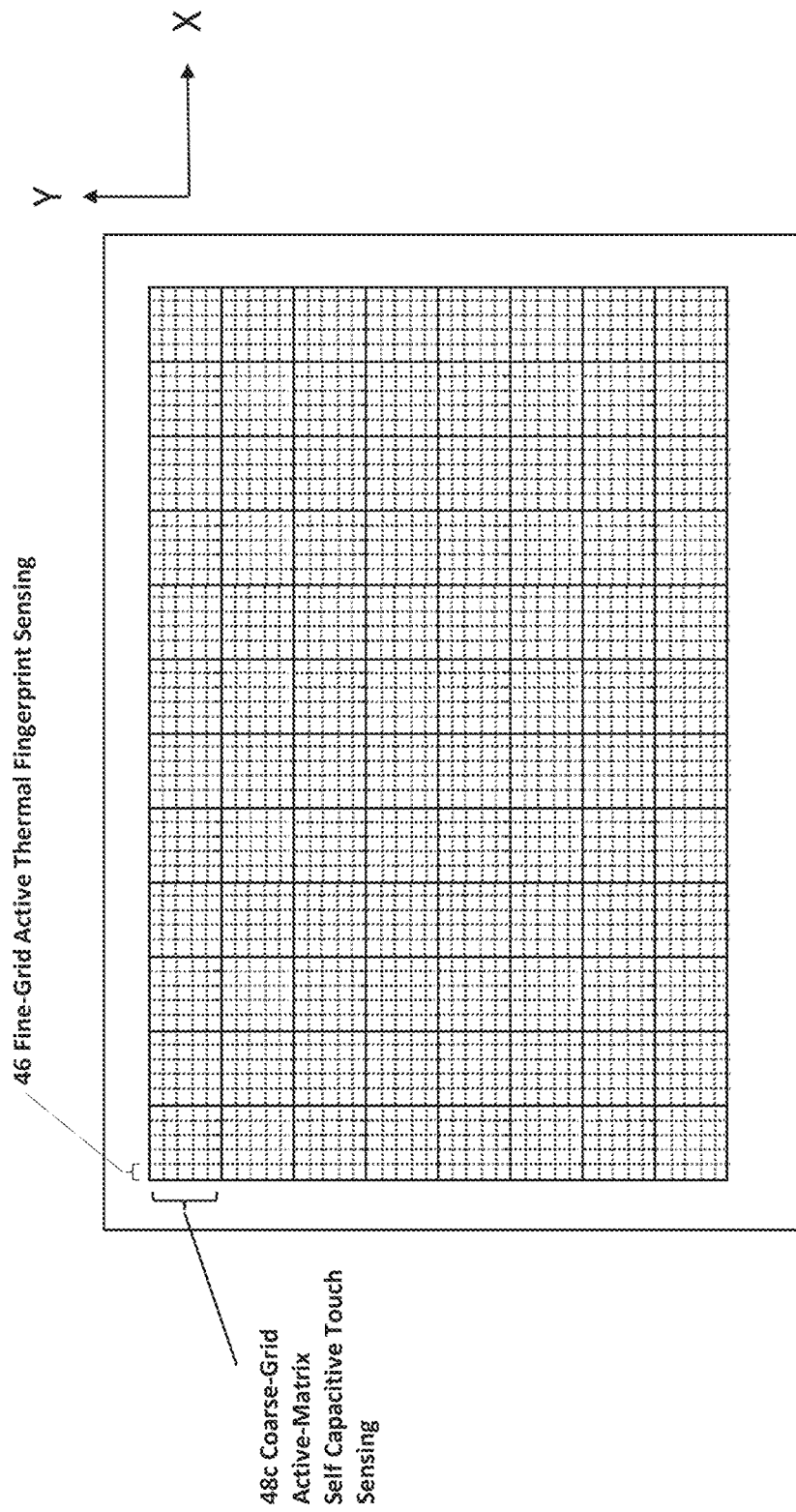
FIG. 6 illustrates one example of the exemplary device of FIG. 5, having coarse-grid active-matrix self-capacitive touch and fine-grid active thermal fingerprint sensors (top view of FIG. 5 through a transparent hard coating) in accordance with some embodiments.

FIG. 6 illustrates one example of the exemplary device of FIG. 5, having coarse-grid active-matrix self-capacitive touch sensing pixels in combination with fine-grid active thermal fingerprint sensing pixels (Top View of FIG. 5) in accordance with some embodiments.

FIGS. 7A-7B illustrate an exemplary device 206 having in-cell type side-by-side top-emitting OLED or micro LED with coarse-grid mutual capacitive touch and fine-grid active thermal fingerprint sensors in accordance with some embodiments. The exemplary device 206 is an example of device 200. FIG. 7B is a plan (top) view illustrating the partial row of the sensor array in the exemplary device of FIG. 7A illustrating the density of emitter pixels, mutual capacitive touch pixels and active thermal sensing pixels in accordance with some embodiments. In FIG. 7B, the letters "G," "R," and "B" represents the colors including green, red, and blue of the subpixels for display, respectively.

The exemplary device 206 comprises a substrate 30, an active layer 60 disposed above the substrate 30, and a transparent hard coating 50 disposed on the active layer 60. The substrate 30 is for both sensor and display, and can be called as "the sensor and display substrate." The active layer 60 comprises pixels for sensing and display, and incorporate both the sensor layer and the display layer together in a single layer. The active layer 60 may include a thin film encapsulant 62 in some embodiments.

FIGS. 7A-7B illustrate another embodiment of the FoD structure of the present disclosure, which is based on coarse-grid passive-matrix mutual capacitive touch and fine-grid active thermal fingerprint sensors being integrated into the display structure itself, with so called in-cell FoD approach. Display pixels 12 such as side-by-side top-emitting OLED or micro LED pixels are integrated with mutual capacitive touch sensing pixels 48 and active thermal fingerprint sensing pixels 46 on the same sheet of glass. The exemplar device 206 also comprises TFTs 11 for display pixels, and the mutual capacitive touch sensing pixels 48 include top and bottom electrodes 48a and 48b. The top and bottom electrodes illustrated in FIG. 7B are separate from each other as shown in FIG. 7A. TFT-based peripheral circuits for addressing the OLED or micro LED emitter pixels, as well as the mutual capacitive touch sensing pixels and active thermal fingerprint sensing pixels can be employed to minimize the connections to external application specific integrated circuits. In-pixel TFTs (at least 2 TFTs for each emitter subpixel) as well as TFTs for peripheral circuits can be based on either transparent oxide semiconductors (IGZO etc.) or non-transparent LTPS TFTs. TFTs 11 for display pixels are different types from TFTs for active thermal sensing for biometric sensing. The TFTs 11 for display pixels are preferably made of LTPS type of TFT because of its stability at different temperature. The TFTs for active thermal sensing are preferably be made of an oxide semiconductor material such as IGZO or modified IGZO because of its temperature sensitivity for temperature sensing.

Referring to FIGS. 7A-7B, TFTs based on either transparent oxide semiconductors or non-transparent LTPS can be used for display pixels. Transparent conducting oxides (TCO), e.g., ITO, or non-transparent metals can be used for mutual capacitive touch electrodes.

Figure 8A:
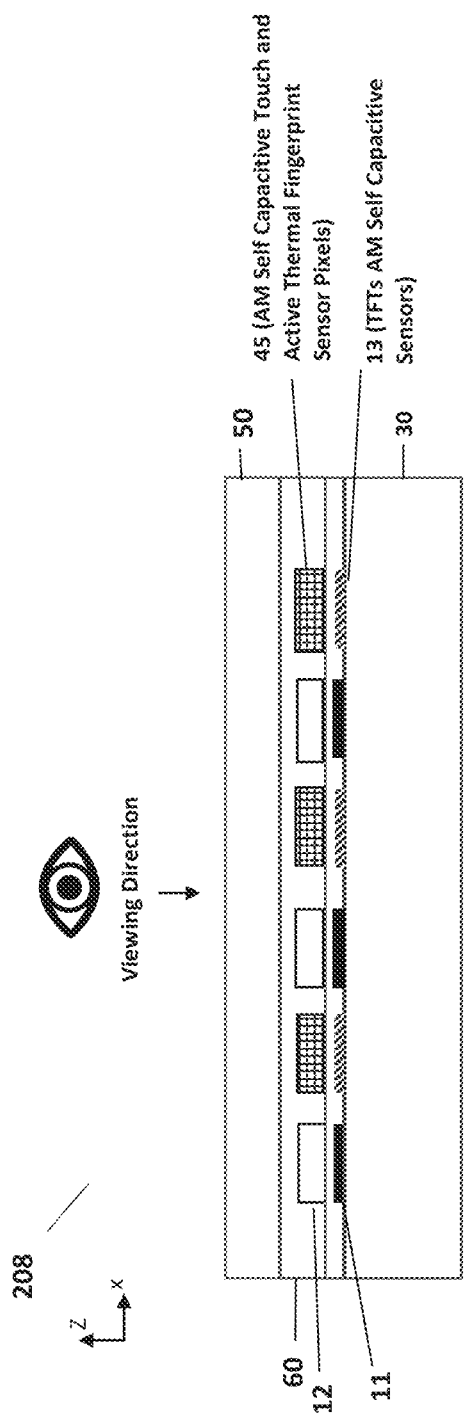
FIGS. 8A-8B illustrate an exemplary device having in-cell type side-by-side top-emitting OLED or micro LED with fine-grid active-matrix self-capacitive touch and active thermal fingerprint sensors.
Figure 8B:
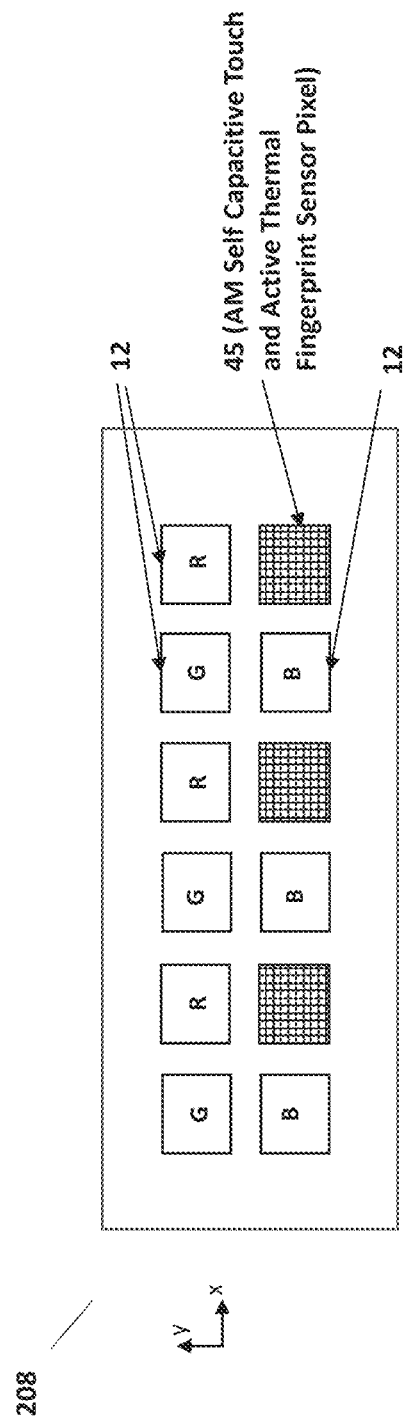

FIGS. 8A-8B illustrate an exemplary device 208 having in-cell type side-by-side top-emitting OLED or micro LED with fine-grid active-matrix self-capacitive touch and active thermal fingerprint sensors. FIG. 8A is a sectional view illustrating the sensor array. FIG. 8B is a top plan view illustrating a partial row of the sensor array. The exemplary device 208 is an example of device 200.

Similar to the exemplary device 206, the exemplary device 208 comprises a substrate 30, an active layer 60 disposed above the substrate 30, and a transparent hard coating 50 disposed on the active layer 60. The active layer 60 comprises pixels for sensing and display, and incorporate both the sensor layer and the display layer together in a single layer. The active layer 60 may include a thin film encapsulant 62 in some embodiments. The active layer 60 comprises display pixels 12 and a pixel matrix 45 comprising both active matrix (AM) self-capacitive touch pixels and active thermal fingerprint sensor pixels. TFTs 11 are used to drive the display pixels 12, and TFTs 13 are used to drive the pixels for AM self-capacitive touch pixels and/or active thermal sensing pixels.

FIGS. 8A-8B illustrate another embodiment of the FoD structure of the present disclosure, which is based on active matrix self-capacitive touch and fingerprint sensors being integrated into the display structure itself, with so called in-cell FoD approach. Display pixels 12 such as side-by-side top-emitting OLED or micro LED pixels are integrated with active matrix self-capacitive touch sensing and active thermal fingerprint sensing pixels 45 on the same sheet of glass. TFT-based peripheral circuits for addressing the OLED or micro LED emitter pixels, as well as the self-capacitive touch sensing and active thermal fingerprint sensing pixels can be employed to minimize the connections to external application specific integrated circuits. In-pixel TFTs (at least 2 TFTs for each emitter subpixel, and 1 TFT for each self-capacitance electrode pixel) as well as TFTs for peripheral circuits can be based on either transparent oxide semiconductors (IGZO etc.) or non-transparent LTPS TFTs.

Referring to FIGS. 8A-8B, TFTs based on either transparent oxide semiconductors or non-transparent LTPS can be used for display and self-capacitance pixels. Self-capacitance pixel electrodes can be either TCOs or metals.

Figure 9C:
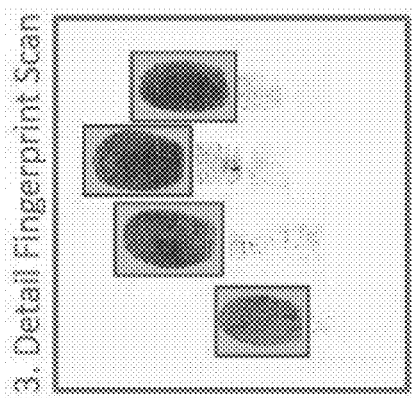
FIGS. 9A-9C illustrate the size and resolution configurable capacitive and thermal scan steps in accordance with some embodiments.
Figure 9B:
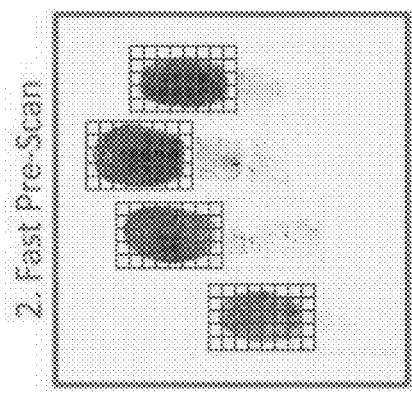
Figure 9A:
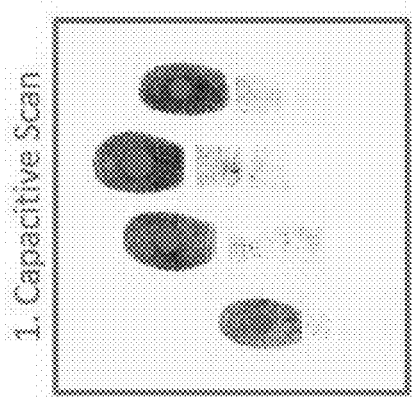

FIGS. 9A-9C illustrate the size and resolution configurable capacitive and thermal scan steps in accordance with some embodiments.

FIGS. 9A-9B illustrate another embodiment of the present disclosure where the FoD system locates and selectively scans only the relevant fingerprint area to save scan time and power, while reducing the MCU memory and processing overhead. Specifically, size and resolution configurable capacitive and thermal scans can be implemented by the following steps: 1. Initial finger detection by fast capacitive scan: identify and locate finger touch locations through full-screen coarse grid capacitive scan. 2. Fast pre scan: small-area coarse grid active thermal scan or active matrix self-capacitive scan to confirm touch locations and determine detail scan boundaries. 3. Detail fingerprint scan: small-area fine grid active thermal scan, optionally in combination with active matrix self-capacitive scan, to acquire high-quality fingerprint images.

The foregoing examples illustrated in FIGS. 1-9 are intended to demonstrate the principles embodied in the present disclosure. Various changes and modifications to the embodiments herein chosen for purposes of illustration will readily occur to those skilled in the art. To the extent that such modifications and variations do not depart from the spirit of the present disclosure, they are intended to be included within the scope thereof which is assessed only by a fair interpretation of the following claims. For instance, while "sensor substrate" is used in the drawings to indicate generic substrate material compatible for TFT fabrication process, it encompasses either rigid glass or flexible substrate material (such as polyimide).

In situations where transparency of the sensor substrate is required, such as in FIGS. 3-6, the polyimide (PI) substrate can be made of transparent type of PI material, and upon completing the touch/fingerprint sensor fabrication process the PI film can be de-bonded from the carrier glass and then either laminated directly onto the display or laminated first onto another transparent supporting substrate such as polyethylene terephthalate (PET) before being laminated onto the display in FIG. 3 and FIG. 5.

In other situations, such as in FIGS. 7-8, rigid glass, or flexible substrate materials (including both transparent and non-transparent types of PI films) can be used as "display and sensor substrate", and the PI film can be de-bonded from the carrier glass at the end of FoD fabrication process and then laminated onto other flexible supporting substrates such as polyethylene terephthalate (PET) to enable flexible fingerprint sensor on display.

Although touch and fingerprint sensors integrated into the displays are shown in FIGS. 3-6, it is obvious to those skilled in the arts that these stand-alone touch and fingerprint sensors can also function independently without the displays being present, and that these stand-alone touch and fingerprint sensors will have the advantage of larger-area, high resolution, with the additional option of being flexible, since they can be manufactured on conventional sheet-to-sheet TFT fab either on a rigid mother glass or on polyimide film coated or laminated onto the rigid mother glass which can later be de-bonded and laminated onto another flexible substrate at the end of the sensor fabrication process.

In the scenario of stand-alone touch and fingerprint sensor application, transparency requirements for the sensor substrate, sensor array and top hard coating can be relaxed. For example, additional non-oxide materials such as silicon carbide, tin selenide, tantalum nitride, or polysilicon can be used to form the thermistors or diodes for the active thermal fingerprint sensor pixels and non-transparent materials such as DLC and SiC can be used to form the hard coating layers. Although OLED and micro LED are used as examples of emissive display emitters in FIG. 7 and FIG. 8, other types of emitters such as electroluminescent quantum dots or quantum-dot light-emitting diodes (QLEDs) and inorganic electroluminescent devices etc. can also be used in a similar way. Although perpendicular rectangular shaped electrodes are illustrated for mutual capacitive touch top & bottom electrodes in FIG. 7, any other commonly used shapes and configurations for mutual capacitive touch electrodes can also be used. Similarly, while the rectangular-shaped scan boundaries are shown in steps 2 and 3 of FIG. 9, they are for illustration purposes only. The actual scan boundaries can be of any shape, regular or irregular, freely adapting to the contact finger shape and size.

For each sensor or device described herein may include other components such as ASIC, MCU, display drive IC, PCBs as described in FIGS. 3 and 5. Through the MCU, the sensor or device or the system comprising such a sensor or device is configured to perform the functions and steps for sensing and display. For example, the steps comprise: detecting a presence of an object having a biometric pattern on the sensor, performing a coarse scan by scanning a fraction of pixels in a pixel array to determine a contact boundary between the object and the sensor, and performing a detailed scan selectively within the contact boundary to provide the image data of the biometric pattern. The steps may also include those for detecting rolling motion and location, combining images, and processing and comparing image data as described in the present disclosure.

In some embodiments, the biometric sensor is a fingerprint sensor, the object is a finger, and the biometric pattern is a fingerprint. In some embodiments, the biometric pattern is on a hand palm, and the sensor or device is for detecting hand palm patterns.

In another aspect, the present disclosure provides a method of making a sensor, a device, or a system comprising the sensor or the device as described herein. The method may include steps of forming each layer based on the structures, and may include steps of deposition and etching.

In another aspect, the present disclosure provides a method of using a device or a system. Such a method comprises steps of: detecting a presence of an object having a biometric pattern on the sensor, performing a coarse scan (a pre-scan) by scanning a fraction of pixels in a pixel array to determine a contact boundary between the object and the sensor, and performing a detailed scan selectively within the contact boundary to provide the image data of the biometric pattern.

In such a method, the presence of an object such as a finger touch on the sensor is detected through the thermal sensing pixels or the capacitive sensing nodes. The coarse scan and the detailed scan are performed through the thermal sensing pixels.

Such a method may further comprise dynamically tracking rolling motion and location of the object through a capacitive scan using the capacitive sensing nodes. The method may further comprise a step or steps for combining biometric images of the object captured through thermal scans during the rolling motion of the object to provide a complete biometric pattern using the MCU.

In some embodiments, the capacitive sensing nodes are mutual capacitance sensing nodes or self-capacitance sensing nodes. The self-capacitance sensing nodes may be passive-matrix addressed, or active-matrix addressed by an array of thin film transistors. The mutual capacitance sensing nodes are configured to be passive-matrix addressed.

Each pixel array described herein comprises sensor elements or pixels such as thermal sensing pixels (as illustrated in the figures). A pixel array may be a two-dimensional network of pixels. In some embodiments, a pixel or sensor element may include one or more diodes connected in series between a pixel row line and a pixel column line. The diodes are close to the sensor surface and in good thermal contact with a fingerprint to be measured, and may act as both pixel heater and temperature sensing element.

The pixel heating power is proportional to the product of the number of the diodes, a given current and voltage across each diode. The diodes are temperature sensitive, and any temperature change in a pixel reflects a corresponding change in voltage if the current is biased, or reflects a corresponding change in current if the voltage is biased.

The pixel diodes can be any microelectronic device construction, with either purely or combined rectifying characteristic. Examples of a suitable diode include, but are not limited to a PN-junction rectifier, a Schottky rectifier, a PIN diode, or any combination thereof. The diodes may be constructed from compound-semiconductors, such as SiGe, or metals such as aluminum and its alloys with suitable properties, or from organic materials. The atomic structures may be mono-crystalline, amorphous or poly-crystalline.

The pixels may be covered with a conductive or semiconductor layer (not shown), which can be grounded to shield and protect the sensor. A protective coating (not shown) may be coated on the conductive or semiconductor layer to provide mechanical and chemical protection during uses.

Referring to FIGS. 9A-9C, for example, an exemplary method comprises at least three steps. A first step is to detect a presence of an object having a biometric pattern on the sensor. A second step is to perform a coarse scan by scanning a fraction of pixels in a pixel array to determine a contact boundary between the object and the sensor. A third step is to perform a detailed scan selectively within the contact boundary to provide the image data of the biometric pattern.

In the first step, during a standby mode, the sensing system periodically executes an initial scan, for example, by capacitive scan using capacitive sensing grid at a low resolution to detect the presence of finger touch(es) on the sensor. Only a small percentage of pixels evenly spread across the sensor pixel array are selected for the finger detection. Once finger touches are detected and are found to be in stable contact with the sensor, the system enters the next pre-scan (a coarse thermal scan) stage selecting another set of pixels around the identified finger touch areas to determine fingerprint boundaries. The system could select a higher percentage of pixels around the identified touch areas to improve boundary computation precision. Afterward, a thermal scan with full resolution (i.e., a detailed thermal) is performed to collect detail fingerprint image within the identified boundaries. The fingerprint scan area is only a small subset of the full pixel array.

One technique to improve image quality and signal-to-noise ratio (SNR) is to average multiple images of the same fingerprint area to produce a final image.

Referring to FIGS. 10A-10D, four exemplary thin film transistors (TFTs) used in the exemplary devices are illustrated. The TFTs may be used in the active thermal fingerprint sensors. An TFT includes a source region, a drain region, and a channel. The channel comprises or is made of an oxide semiconductor material in the channel. The oxide semiconductor material may be a metal oxide such as IGZO and modified IGZO as described herein. The TFT may further comprise a substrate, a gate, a gate insulator, and a etch stop layer.

Figure 10A:
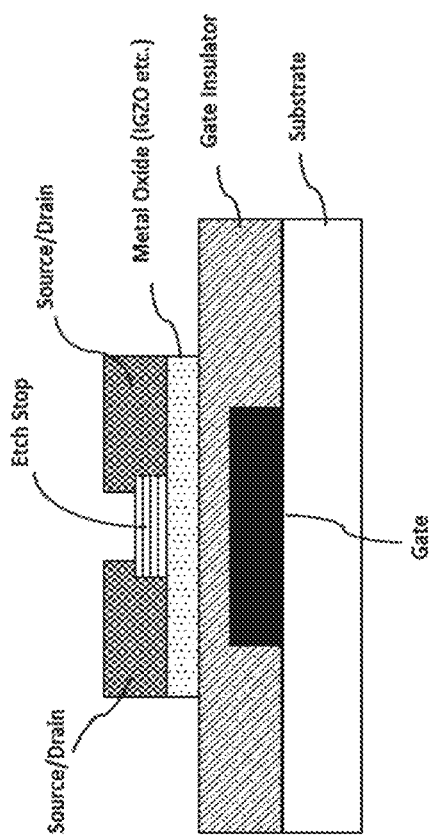
FIGS. 10A-10D illustrate four exemplary thin film transistor (TFT) device structures having a channel comprising an oxide semiconductor material used in the exemplary device, including in the active thermal fingerprint sensors, in accordance with some embodiments.

FIG. 10A illustrates a TFT with a gate at the bottom and source/drain regions, and the channel and the etch stop layer on the top. The oxide semiconductor layer (channel) is disposed below the source/drain regions and above the gate.

Figure 10B:
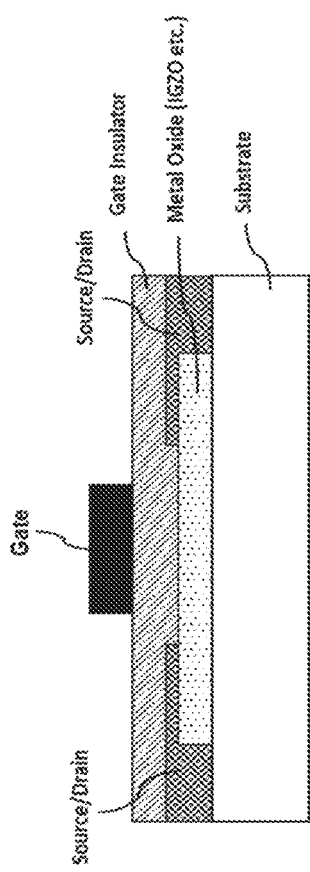

FIG. 10B illustrates a TFT with a gate on the top and the source/drain regions at the bottom. The oxide semiconductor layer (channel) is disposed between the source/drain regions.

Figure 10C:
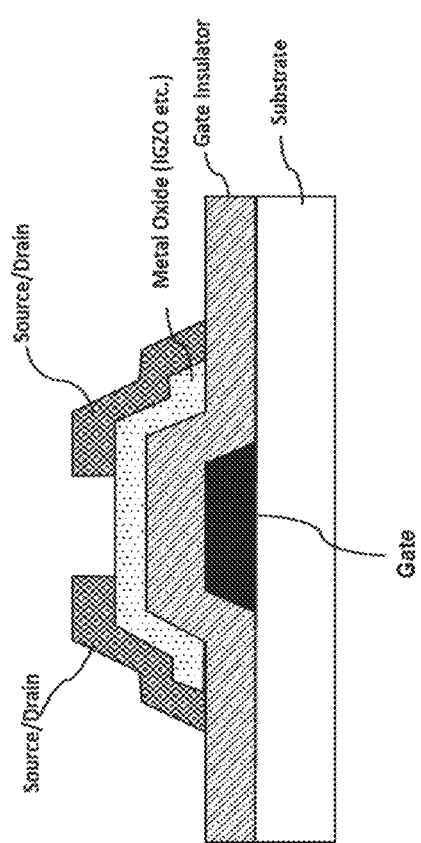

FIG. 10C illustrates a TFT with a gate on the bottom and the source/drain regions at the top. The oxide semiconductor layer (channel) is disposed between the source/drain regions and the gate.

Figure 10D:
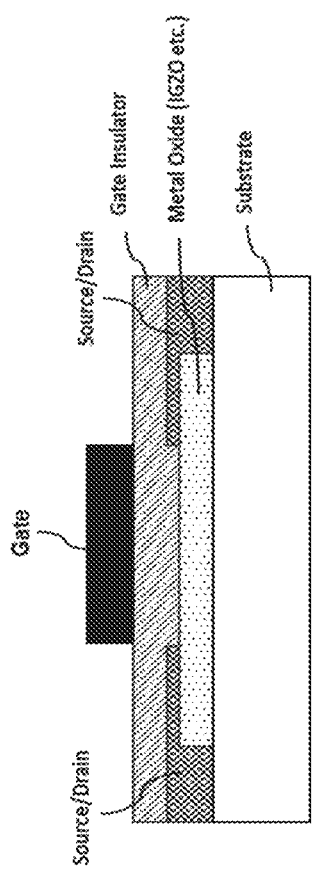

FIG. 10D illustrates a self-aligned TFT with a gate on the top and the source/drain regions at the bottom. The oxide semiconductor layer (channel) is disposed between the source/drain regions.

Materials for source/drain regions of TFTs comprising oxide semiconductor material such as IGZO or modified IGZO are metals or transparent conductors such as ITO or other transparent conducting oxides (TCO). Two-terminal diodes using oxide semiconductors may be Schottky diodes, which are made by depositing metals with different work functions like Mo, Ti, Ni, Pt or Au onto the two ends of the oxide semiconductor channels. Since oxide semiconductor is normally n-type, low work function metal is deposited on one end of the oxide semiconductor channel to form ohmic contact, and high work function metal is deposited on the other end of the oxide semiconductor channel to form Schottky contact in order to achieve asymmetric structure for rectifying I-V behavior. In some embodiments, if a drain region and a gate of TFTs comprising the oxide semiconductor such as IGZO or modified IGZO is connected, the TFT becomes a diode as well. Thin film thermistor is two terminal passive thin film device and may not be based on TFTs. Thin film thermistors are made by depositing thin film metals of the same type such as Pt, Au, Ti/TIN, Ni, Cr, Al or Mo onto the two ends of oxide semiconductor channels. IGZO and ZnO, $Mn_3O_4$, $Co_3O_4$ and NiO are examples of oxide semiconductors used in NTC (Negative Temperature Coefficient) thin film oxide thermistors.

The devices such as in-cell or out-cell biometric sensor on display devices have excellent anti-spoofing performance. For example, in some embodiments, the capacitive touch sensing elements are active matrix self-capacitive touch sensors used in combination with active thermal sensing to enhance anti-spoofing performance. For another example, the thermal sensing pixels comprises pixels for passive thermal sensing in combination with active thermal sensing to enhance anti-spoofing performance.

Table 1 summarizes some examples of the exemplary biometric sensors such as fingerprint sensors and biometric sensors on display (SoD) such as fingerprint sensor on display (FoD) with combinations of the structures and features described herein. Table 1 includes the examples for illustration only, and it is not intended to exhaust the possible combinations. In Table 1, the abbreviations "AM" and "PM" refer to active matrix and passive matrix, respectively. The term "sensor" refers to a biometric sensor. The term "SoD" device refer to a Biometric Sensor on Display Device. The term "micro T sensor" refers to a micro temperature sensor in a pixel.

TABLE 1

| | | Thermal Sensing | | | | Capacitive Touch Sensing | |
|---|---|---|---|---|---|---|---|
| | | Active Thermal | Passive Thermal | Combined Micro T Sensor & micro heater | Separate Micro T Sensor & micro heater | SoD Type | |
| | | | | | | Out-cell In-cell | PM Mutual | AM Self |
| S1 | Sensor | Y | | Y | | | | |
| S2 | Sensor | Y | | | Y | | | |
| S3 | Sensor | Y | Y | | Y | | | |

TABLE 1-continued

| | | | Thermal Sensing | | | | Capacitive Touch Sensing | |
|---|---|---|---|---|---|---|---|---|
| | | | | Combined Micro T Sensor & | Separate Micro T Sensor & | SoD Type | | |
| | | Active Thermal | Passive Thermal | micro heater | micro heater | Out-cell | In-cell | PM Mutual | AM Self |
| S4 | Sensor | Y | | Y | | | | | Y |
| S5 | Sensor | Y | | | Y | | | | Y |
| S6 | Sensor | Y | Y | | Y | | | | Y |
| S7 | SoD Device | Y | | Y | | Y | | Y | |
| S8 | SoD Device | Y | | | Y | Y | | Y | |
| S9 | SoD Device | Y | | Y | | Y | | | Y |
| S10 | SoD Device | Y | | | Y | Y | | | Y |
| S11 | SoD Device | Y | Y | | Y | Y | | Y | |
| S12 | SoD Device | Y | | Y | | Y | | | Y |
| S13 | SoD Device | Y | | | Y | Y | | | Y |
| S14 | SoD Device | Y | Y | | Y | Y | | | Y |
| S15 | SoD Device | Y | | Y | | | Y | Y | |
| S16 | SoD Device | Y | | | Y | | Y | Y | |
| S17 | SoD Device | Y | | Y | | | Y | | Y |
| S18 | SoD Device | Y | | | Y | | Y | | Y |
| S19 | SoD Device | Y | Y | | Y | | Y | Y | |
| S20 | SoD Device | Y | | Y | | | Y | | Y |
| S21 | SoD Device | Y | | | Y | | Y | | Y |
| S22 | SoD Device | Y | Y | | Y | | Y | | Y |

As illustrated in Table 1, in some preferred embodiments, the capacitive touch sensing elements are active matrix (AM) self-capacitive touch sensors used in combination with active thermal sensing to enhance anti-spoofing performance. In some other preferred embodiments, the combination of passive thermal sensing and active thermal sensing can be used to enhance anti-spoofing performance. These examples having better anti-spoofing performance include, but are not limited to, Examples S3, S4, S5, S6, S9, S10, S11, S12, S13, S14, S17, S18, S19, S20, S21, and S22 shown in Table 1. The active matrix (AM) self-capacitive touch sensors can be used to scan in high resolution, for example, in a "fingerprint mode" to improve the anti-spoofing performance. The devices such as Examples S14 and S22 are more preferable. If the AM self-capacitive touch sensor is scanned in high resolution ("fingerprint mode"), Examples S14 and S22 provide the best anti-spoofing performance as three separate modes of fingerprint sensing are used. These modes include active thermal sensing, passive thermal sensing, and AM self-capacitive sensing.

The present disclosure also provides a system comprising each sensor or device as described herein. The sensor, the device, the system, and the method provided in the present disclosure provide significant benefits, which the existing technologies cannot provide. For example, the sensors and the devices provided in the present disclosure provide large-area and high-resolution biometric sensing, also possibly with combination with display. They have excellent anti-spoofing performance shown by extremely low FRR and FAR values.

The methods and system described herein may be at least partially embodied in the form of computer-implemented processes and apparatus for practicing those processes. The disclosed methods may also be at least partially embodied in the form of tangible, non-transient machine readable storage media encoded with computer program code. The media may include, for example, RAMs, ROMs, CD-ROMs, DVD-ROMs, BD-ROMs, hard disk drives, flash memories, or any other non-transient machine-readable storage medium, or any combination of these mediums, wherein, when the computer program code is loaded into and executed by a computer, the computer becomes an apparatus for practicing the method. The methods may also be at least partially embodied in the form of a computer into which computer program code is loaded and/or executed, such that, the computer becomes an apparatus for practicing the methods. When implemented on a general-purpose processor, the computer program code segments configure the processor to create specific logic circuits. The methods may alternatively be at least partially embodied in a digital signal processor formed of application specific integrated circuits for performing the methods.

Although the subject matter has been described in terms of exemplary embodiments, it is not limited thereto. Rather, the appended claims should be construed broadly, to include other variants and embodiments, which may be made by those skilled in the art.

What is claimed is:

1. A sensor for biometric sensing, comprising:
   a pixel matrix having a plurality of pixels, the plurality of pixels configured to measure a biometric pattern;
   a micro temperature sensor and a micro heater in each pixel, and the micro temperature sensor comprising an oxide semiconductor material,
   wherein the plurality of pixels comprise thermal sensing pixels configured to operate based on at least an active thermal sensing principle, in which a low power heat pulse is applied and a response corresponding to a biometric pattern is measured,
   wherein the sensor further comprises capacitive touch sensing elements, and the capacitive touch sensing elements are active matrix self-capacitive touch sensors used in combination with active thermal sensing to enhance anti-spoofing performance.

2. The sensor of claim 1, wherein the micro heater comprises the oxide semiconductor material or an electrically conductive material.

3. The sensor of claim 2, wherein the electrically conductive material is selected from the group consisting of a metal, a transparent conductive oxide (TCO), and a combination thereof.

4. The sensor of claim 1, wherein the oxide semiconductor material comprises indium gallium zinc oxide (IGZO), a modified IGZO, or ZnO.

5. The sensor of claim 4, wherein the modified IGZO comprises an element selected from the group consisting of Al, Sn, Ti, Ta, Zr, Co, Ni, Hf, Si, F, Ge, Y, La, and any combination thereof, which may partially or completely replace existing cations in IGZO, or serve as additional cations.

6. The sensor of claim 4, wherein the IGZO or a modified IGZO is amorphous or crystalline.

7. The sensor of claim 1, wherein the oxide semiconductor material has a temperature coefficient in a range of from −2 mV/° C. and −200 mV/° C.

8. The sensor of claim 1, wherein the oxide semiconductor material has a sheet resistance in a range of from 5 KΩ/sq to 3 MΩ/sq.

9. The sensor of claim 1, wherein each of the micro temperature sensor and the micro heater is a thin film transistor (TFT), a diode, or a thermistor.

10. The sensor of claim 1, wherein the micro temperature sensor and the micro heater are combined into one device in each pixel.

11. The sensor of claim 1, wherein the micro temperature sensor and the micro heater are separate in each pixel, and the micro heater is a portion of a plurality of micro heater lines.

12. A sensor for biometric sensing, comprising:
    a pixel matrix having a plurality of pixels, the plurality of pixels configured to measure a biometric pattern;
    a micro temperature sensor and a micro heater in each pixel, and the micro temperature sensor comprising an oxide semiconductor material,
    wherein the plurality of pixels comprise thermal sensing pixels configured to operate based on at least an active thermal sensing principle, in which a low power heat pulse is applied and a response corresponding to a biometric pattern is measured,
    wherein the thermal sensing pixels comprise pixels for passive thermal sensing in combination with active thermal sensing to enhance anti-spoofing performance.

13. A device or system comprising the sensor of claim 1.

14. A method of making the sensor of claim 1, comprising forming the pixel matrix having a plurality of pixels with the micro temperature sensor and the micro heater in each pixel.

15. A method of using the sensor of claim 1, comprising a step of measuring or capturing an image of a biometric pattern of a subject.

16. The method of claim 15, wherein the biometric pattern is a fingerprint or a pattern from a hand palm.

17. The sensor of claim 12, wherein the micro heater comprises the oxide semiconductor material or an electrically conductive material.

18. The sensor of claim 17, wherein the electrically conductive material is selected from the group consisting of a metal, a transparent conductive oxide (TCO), and a combination thereof.

19. The sensor of claim 12, wherein the oxide semiconductor material comprises indium gallium zinc oxide (IGZO), a modified IGZO, or ZnO.

20. The sensor of claim 19, wherein the modified IGZO comprises an element selected from the group consisting of Al, Sn, Ti, Ta, Zr, Co, Ni, Hf, Si, F, Ge, Y, La, and any combination thereof, which may partially or completely replace existing cations in IGZO, or serve as additional cations.

21. A device or system comprising the sensor of claim 12.

22. A method of making the sensor of claim 12, comprising forming the pixel matrix having a plurality of pixels with the micro temperature sensor and the micro heater in each pixel.

23. A method of using the sensor of claim 12, comprising a step of measuring or capturing an image of a biometric pattern of a subject.

24. The method of claim 23, wherein the biometric pattern is a fingerprint or a pattern from a hand palm.

* * * * *